US012684572B2

(12) United States Patent
Li et al.

(10) Patent No.: US 12,684,572 B2
(45) Date of Patent: Jul. 14, 2026

(54) HYBRID AUTOMATIC REPEAT REQUEST HARQ CODEBOOK GENERATION METHOD AND APPARATUS

(71) Applicant: HUAWEI TECHNOLOGIES CO., LTD., Shenzhen (CN)

(72) Inventors: Xinxian Li, Shanghai (CN); Jinlin Peng, Shanghai (CN); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 515 days.

(21) Appl. No.: 18/172,496

(22) Filed: Feb. 22, 2023

(65) Prior Publication Data

US 2023/0199766 A1 Jun. 22, 2023

Related U.S. Application Data

(63) Continuation of application No. PCT/CN2020/111273, filed on Aug. 26, 2020.

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04W 72/23* (2023.01); *H04W 76/20* (2018.02)

(58) Field of Classification Search
CPC . H04W 72/1273; H04W 76/20; H04W 72/23; H04L 1/1812
See application file for complete search history.

(56) References Cited

U.S. PATENT DOCUMENTS

| | | | | |
|---|---|---|---|---|
| 11,632,196 | B2 * | 4/2023 | Saber | H04L 1/1861 |
| | | | | 370/329 |
| 2011/0194500 | A1 * | 8/2011 | Kim | H04L 5/0053 |
| | | | | 370/328 |

(Continued)

FOREIGN PATENT DOCUMENTS

| | | |
|---|---|---|
| CN | 106160983 A | 11/2016 |
| CN | 110086583 A | 8/2019 |
| CN | 110149717 A | 8/2019 |

OTHER PUBLICATIONS

CATT: "Discussion on multi-cell POSCH scheduling via a single DCI", 3GPP Draft; R1-2005697, Aug. 8, 2020, total 6 pages.

(Continued)

*Primary Examiner* — Jael M Ulysse
(74) *Attorney, Agent, or Firm* — HAUPTMAN HAM, LLP

(57) ABSTRACT

This application provides a hybrid automatic repeat request HARQ codebook generation method and an apparatus. The method includes: A terminal device receives a first message from a network device, where the first message is for scheduling downlink data in a plurality of cells. The terminal device generates a HARQ codebook based on the first message. This application provides the HARQ codebook generation method for a case in which there are a plurality of scheduled cells. According to the foregoing method, transmission performance can be effectively ensured. For example, a transmission opportunity can be effectively increased, or a transmission error caused by poor channel quality can be effectively avoided, so that a flexible and variable service volume and/or communication requirement can be met.

12 Claims, 14 Drawing Sheets

100

111

112

121

113

(51) Int. Cl.
      *H04W 72/23*      (2023.01)
      *H04W 76/20*      (2018.01)

(56)            References Cited

U.S. PATENT DOCUMENTS

| | | | | |
|---|---|---|---|---|
| 2012/0320805 | A1* | 12/2012 | Yang | H04L 5/0053 |
| | | | | 370/280 |
| 2013/0242816 | A1* | 9/2013 | He | H04N 21/41407 |
| | | | | 370/280 |
| 2014/0022967 | A1* | 1/2014 | Yang | H04L 5/0055 |
| | | | | 370/280 |
| 2014/0078941 | A1* | 3/2014 | Seo | H04L 5/0055 |
| | | | | 370/280 |
| 2014/0341096 | A1* | 11/2014 | Ko | H04L 1/1896 |
| | | | | 370/280 |
| 2017/0079013 | A1* | 3/2017 | Noh | H04L 1/1825 |
| 2017/0118658 | A1* | 4/2017 | Hwang | H04W 88/02 |
| 2017/0134140 | A1* | 5/2017 | Park | H04L 5/0055 |
| 2018/0019843 | A1* | 1/2018 | Papasakellariou | H04W 72/20 |
| 2018/0042043 | A1* | 2/2018 | Babaei | H04W 72/20 |
| 2018/0132265 | A1* | 5/2018 | Guan | H04W 72/542 |
| 2018/0241510 | A1* | 8/2018 | Shen | H04L 1/18 |
| 2018/0242360 | A1* | 8/2018 | Noh | H04L 1/1657 |
| 2018/0270851 | A1* | 9/2018 | Bhattad | H04W 72/23 |
| 2018/0376490 | A1* | 12/2018 | Lunttila | H04L 1/1854 |
| 2019/0074929 | A1* | 3/2019 | Aiba | H04L 1/0025 |
| 2019/0103943 | A1* | 4/2019 | Wang | H04L 1/1854 |
| 2019/0215870 | A1* | 7/2019 | Babaei | H04W 24/10 |
| 2019/0306841 | A1* | 10/2019 | Huang | H04L 5/0055 |
| 2019/0312688 | A1* | 10/2019 | Baldemair | H04L 5/0032 |
| 2020/0059327 | A1* | 2/2020 | Kini | H04L 1/1812 |
| 2020/0084789 | A1* | 3/2020 | Wang | H04L 1/1614 |
| 2020/0145973 | A1* | 5/2020 | Lin | H04L 1/1812 |
| 2020/0267597 | A1* | 8/2020 | Huang | H04L 1/1812 |
| 2020/0295882 | A1* | 9/2020 | Wang | H04L 1/1896 |
| 2020/0366415 | A1* | 11/2020 | Khoshnevisan | H04W 16/14 |
| 2021/0050957 | A1* | 2/2021 | Khoshnevisan | H04L 1/1854 |
| 2021/0092759 | A1* | 3/2021 | Xiong | H04W 72/0446 |
| 2021/0105102 | A1* | 4/2021 | Li | H04L 1/1896 |
| 2021/0143943 | A1* | 5/2021 | Zhou | H04W 72/0453 |
| 2021/0360666 | A1* | 11/2021 | Yoshimura | H04L 1/1896 |
| 2022/0045805 | A1* | 2/2022 | Karaki | H04L 1/1864 |
| 2022/0052794 | A1* | 2/2022 | Xu | H04L 5/001 |
| 2022/0123872 | A1* | 4/2022 | Zhang | H04L 1/1861 |
| 2022/0140954 | A1* | 5/2022 | Kim | H04L 1/1861 |
| | | | | 370/329 |
| 2022/0158774 | A1* | 5/2022 | Liu | H04L 1/1854 |
| 2022/0167320 | A1* | 5/2022 | Lee | H04L 1/1671 |
| 2022/0201724 | A1* | 6/2022 | Zhang | H04L 1/1896 |
| 2022/0399960 | A1* | 12/2022 | Bae | H04W 72/1273 |
| 2023/0156741 | A1* | 5/2023 | Fu | H04L 5/001 |
| | | | | 370/329 |
| 2023/0318792 | A1* | 10/2023 | Cirik | H04W 72/23 |
| | | | | 370/330 |
| 2023/0327824 | A1* | 10/2023 | Yang | H04L 1/1812 |
| 2023/0370206 | A1* | 11/2023 | Zhou | H04L 5/001 |
| 2024/0413933 | A1* | 12/2024 | Cirik | H04W 24/08 |

OTHER PUBLICATIONS

Extended European Search Report issued in corresponding European Application No. 20950637.7, dated Sep. 18, 2023, pp. 1-6.

* cited by examiner

1

HYBRID AUTOMATIC REPEAT REQUEST HARQ CODEBOOK GENERATION METHOD AND APPARATUS

CROSS-REFERENCE TO RELATED APPLICATION

This application is a continuation of International Application No. PCT/CN2020/111273, filed on Aug. 26, 2020, the disclosure of which is hereby incorporated by reference in its entirety.

TECHNICAL FIELD

This application relates to the communications field, and more specifically, to a hybrid automatic repeat request HARQ codebook generation method and an apparatus.

BACKGROUND

In a current communication system, after receiving data sent by a transmitting end, a receiving end needs to send, to the transmitting end, hybrid automatic repeat request (HARQ) feedback information that is determined based on a decoding result. When the receiving end fails to perform decoding, the transmitting end needs to retransmit the data based on the HARQ feedback information.

With evolution of technologies, a multi-carrier scenario is introduced. For example, carrier aggregation (CA) means that two or more carriers are aggregated to support a larger transmission bandwidth. Existing aggregation of downlink carriers may alternatively be understood as aggregation of a plurality of cells. In this case, after a multi-carrier mechanism is introduced, a retransmission mechanism needs to be updated urgently.

SUMMARY

This application provides a hybrid automatic repeat request HARQ codebook generation method and an apparatus, which can be applied to a serving cell extended to a plurality of cells or a cell having a plurality of carriers. The plurality of carriers may be located in one cell, or may be located in different cells. A manner of generating a HARQ codebook is provided.

According to a first aspect, a hybrid automatic repeat request HARQ codebook generation method is provided. The method includes: receiving a first message from a network device, where the first message is for scheduling downlink data in a plurality of cells; and generating a HARQ codebook based on the first message.

Based on the foregoing technical solution, at least one serving cell (namely, an example of a cell) may have a plurality of carriers. When the network device configures the plurality of carriers or the plurality of cells for a terminal device, the network device or the terminal device may obtain the HARQ codebook and/or corresponding HARQ information according to the foregoing HARQ codebook generation method, to ensure effective communication.

With reference to the first aspect, in some implementations of the first aspect, the method further includes: receiving the downlink data from the network device, where the downlink data is located in a same transport block.

With reference to the first aspect, in some implementations of the first aspect, the downlink data in the plurality of cells includes: the plurality of cells have a same transport block for carrying the downlink data; or the plurality of cells have different transport blocks for carrying the downlink data.

With reference to the first aspect, in some implementations of the first aspect, the plurality of cells include at least a second cell and a first cell that is for receiving the first message. Alternatively, the plurality of cells include at least a first cell and a second cell, where the first cell has a first transport block for a first physical downlink shared channel PDSCH, and the second cell has a second transport block for a second PDSCH.

With reference to the first aspect, in some implementations of the first aspect, the first message indicates downlink control information DCI. The receiving the downlink data from the network device includes: receiving the PDSCHs of the first cell and the second cell based on the DCI. The generating a HARQ codebook based on the first message includes: determining the HARQ codebook based on the DCI.

With reference to the first aspect, in some implementations of the first aspect, the method further includes: obtaining a PDCCH monitoring occasion by using a second message; and receiving the DCI on the PDCCH monitoring occasion, where there are one or more pieces of DCI.

With reference to the first aspect, in some implementations of the first aspect, the DCI indicates a DAI of the first PDSCH of the first cell, the PDSCH of the second cell shares the DAI, and the DAI includes a counter DAI C-DAI and a total DAI T-DAI. The HARQ codebook includes HARQ information corresponding to the first PDSCH and HARQ information corresponding to the second PDSCH.

With reference to the first aspect, in some implementations of the first aspect, the DCI indicates a T-DAI and a first C-DAI of the first PDSCH of the first cell, a second C-DAI of the PDSCH of the second cell, and the PDSCH of the second cell shares the T-DAI. The HARQ codebook includes HARQ information corresponding to the first PDSCH and HARQ information corresponding to the second PDSCH.

With reference to the first aspect, in some implementations of the first aspect, the first message is an RRC message. The generating a HARQ codebook based on the first message specifically includes: determining the first PDSCH of the first cell based on the RRC message; determining a PDSCH receiving occasion set based on the first PDSCH of the first cell; and determining the HARQ codebook based on the PDSCH receiving occasion set. The HARQ codebook includes HARQ information corresponding to the first PDSCH and HARQ information corresponding to the second PDSCH.

With reference to the first aspect, in some implementations of the first aspect, the first message is an RRC message. The generating a HARQ codebook based on the first message includes: determining the first PDSCH of the first cell and the PDSCH of the second cell based on the RRC message; determining a PDSCH receiving occasion set based on the first PDSCH of the first cell and the PDSCH of the second cell; and determining the HARQ codebook based on the PDSCH receiving occasion set, where the HARQ codebook includes first HARQ information corresponding to the first PDSCH and second HARQ information corresponding to the second PDSCH. One of the first HARQ information and the second HARQ information is valid.

With reference to the first aspect, in some implementations of the first aspect, the first message is an RRC message. The generating a HARQ codebook based on the first message includes: determining the first PDSCH of the first cell and the PDSCH of the second cell based on the RRC message; determining a PDSCH receiving occasion set based on the first PDSCH of the first cell and the PDSCH of the second cell; and determining the HARQ codebook based on the PDSCH receiving occasion set, where the HARQ codebook includes first HARQ information corresponding to the first PDSCH and second HARQ information corresponding to the second PDSCH. The first HARQ information is the same as the second HARQ information.

According to a second aspect, a hybrid automatic repeat request HARQ information generation method is provided. The method includes: sending a first message to a terminal device, where the first message is for scheduling downlink data in a plurality of cells; and receiving a HARQ codebook from the terminal device.

Based on the foregoing technical solution, at least one serving cell (namely, an example of a cell) may have a plurality of carriers. When a network device configures the plurality of carriers or the plurality of cells for the terminal device, the network device or the terminal device may obtain the HARQ codebook and/or corresponding HARQ information according to the foregoing HARQ codebook generation method, to ensure effective communication.

With reference to the second aspect, in some implementations of the second aspect, the method further includes: sending the downlink data to the terminal device, where the downlink data is located in a same transport block.

With reference to the second aspect, in some implementations of the second aspect, the downlink data in the plurality of cells includes: the plurality of cells have a same transport block for carrying the downlink data; or the plurality of cells have different transport blocks for carrying the downlink data.

With reference to the second aspect, in some implementations of the second aspect, the plurality of cells include at least a second cell and a first cell that is for sending the first message. Alternatively, the plurality of cells include at least a first cell and a second cell, where the first cell has a first transport block for a first physical downlink shared channel PDSCH, and the second cell has a second transport block for a second PDSCH.

With reference to the second aspect, in some implementations of the second aspect, the first message indicates downlink control information DCI. The sending the downlink data to the terminal device includes: sending the PDSCHs of the first cell and the second cell to the terminal device based on the DCI.

With reference to the second aspect, in some implementations of the second aspect, the method further includes: indicating a PDCCH monitoring occasion to the terminal device by using a second message; and sending the DCI to the terminal device on the PDCCH monitoring occasion, where there are one or more pieces of DCI.

With reference to the second aspect, in some implementations of the second aspect, the DCI indicates a DAI of the first PDSCH of the first cell, the PDSCH of the second cell shares the DAI, and the DAI includes a counter DAI C-DAI and a total DAI T-DAI. The HARQ codebook includes: HARQ information corresponding to the first PDSCH and HARQ information corresponding to the second PDSCH.

With reference to the second aspect, in some implementations of the second aspect, the DCI indicates a T-DAI and a first C-DAI of the first PDSCH of the first cell, a second C-DAI of the PDSCH of the second cell, and the PDSCH of the second cell shares the T-DAI. The HARQ codebook includes HARQ information corresponding to the first PDSCH and HARQ information corresponding to the second PDSCH.

With reference to the second aspect, in some implementations of the second aspect, the first message is an RRC message. The HARQ codebook includes HARQ information corresponding to the first PDSCH and HARQ information corresponding to the second PDSCH. Optionally, the RRC message is used by the terminal device to determine the first PDSCH of the first cell.

With reference to the second aspect, in some implementations of the second aspect, the first message is an RRC message. The HARQ codebook includes first HARQ information corresponding to the first PDSCH and second HARQ information corresponding to the second PDSCH, where one of the first HARQ information and the second HARQ information is valid. Optionally, the RRC message is used by the terminal device to determine the first PDSCH of the first cell and the PDSCH of the second cell.

With reference to the second aspect, in some implementations of the second aspect, the first message is an RRC message. The HARQ codebook includes first HARQ information corresponding to the first PDSCH and second HARQ information corresponding to the second PDSCH, where the first HARQ information is the same as the second HARQ information. Optionally, the RRC message is used by the terminal device to determine the first PDSCH of the first cell and the PDSCH of the second cell.

According to a third aspect, a terminal device is provided. The terminal device has a function of implementing the terminal device in the foregoing method design in the first aspect. The function may be implemented by hardware, or may be implemented by hardware by executing corresponding software. The hardware or the software includes one or more units corresponding to the foregoing function.

According to a fourth aspect, a network device is provided. The network device has a function of implementing the network device in the foregoing method design in the second aspect. The function may be implemented by hardware, or may be implemented by hardware by executing corresponding software. The hardware or the software includes one or more units corresponding to the foregoing function.

According to a fifth aspect, a terminal device is provided. The terminal device includes a transceiver, a processor, and a memory. The processor is configured to control the transceiver to send and receive information. The memory is configured to store a computer program. The processor is configured to invoke the computer program from the memory and run the computer program, so that the terminal device performs the method according to any one of the first aspect and the possible implementations of the first aspect.

According to a sixth aspect, a network device is provided. The network device includes a transceiver, a processor, and a memory. The processor is configured to control the transceiver to send and receive information. The memory is configured to store a computer program. The processor is configured to invoke the computer program from the memory and run the computer program, so that the network device performs the method according to any one of the second aspect and the possible implementations of the second aspect.

According to a seventh aspect, an apparatus is provided. The apparatus may be the terminal device in the foregoing method designs, or may be a chip disposed in the terminal device. The apparatus includes a processor. The processor is coupled to a memory, and may be configured to execute instructions in the memory, to implement the method performed by the terminal device according to any one of the first aspect and the possible implementations of the first aspect. Optionally, the apparatus further includes the memory. Optionally, the apparatus further includes a communication interface, and the processor is coupled to the communication interface.

According to an eighth aspect, an apparatus is provided. The apparatus may be the network device in the foregoing method designs, or may be a chip disposed in the network device. The apparatus includes a processor. The processor is coupled to a memory, and may be configured to execute instructions in the memory, to implement the method performed by the network device according to any one of the second aspect and the possible implementations of the second aspect. Optionally, the apparatus further includes the memory. Optionally, the apparatus further includes a communication interface, and the processor is coupled to the communication interface.

According to a ninth aspect, a communication system is provided. The communication system includes the network device and the terminal device in the foregoing method designs.

According to a tenth aspect, a computer program product is provided. The computer program product includes computer program code. When the computer program code is run on a computer, the computer performs the methods in the foregoing aspects.

According to an eleventh aspect, a computer-readable medium is provided. The computer-readable medium stores program code. When the computer program code is run on a computer, the computer performs the methods in the foregoing aspects.

According to a twelfth aspect, a chip system is provided. The chip system includes a processor, configured to support a terminal device in implementing functions in the foregoing aspects, for example, generating, receiving, sending, or processing data and/or information in the foregoing methods. In a possible design, the chip system further includes a memory. The memory is configured to store program instructions and data that are for the terminal device. The chip system may include a chip, or may include a chip and another discrete component.

According to a thirteenth aspect, a chip system is provided. The chip system includes a processor, configured to support a network device in implementing functions in the foregoing aspects, for example, generating, receiving, sending, or processing data and/or information in the foregoing methods. In a possible design, the chip system further includes a memory. The memory is configured to store program instructions and data that are for the network device. The chip system may include a chip, or may include a chip and another discrete component.

DESCRIPTION OF EMBODIMENTS

The following describes the technical solutions of this application with reference to the accompanying drawings.

The technical solutions of embodiments of this application may be applied to various communication systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio (NR) system.

Figure 1:
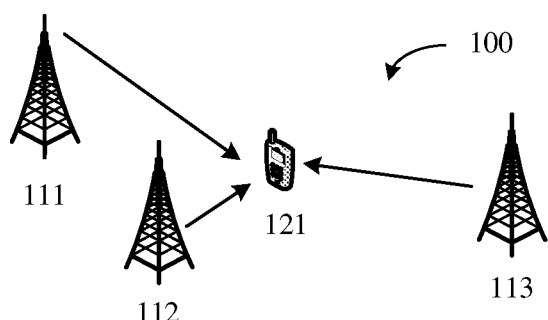
FIG. 1 is a schematic diagram of a communication system applicable to a HARQ codebook generation method according to an embodiment of this application.

For ease of understanding embodiments of this application, a communication system shown in FIG. 1 is first used as an example to describe in detail a communication system applicable to embodiments of this application. FIG. 1 is a schematic diagram of a wireless communication system 100 to which embodiments of this application are applicable. As shown in FIG. 1, the wireless communication system 100 may include one or more network devices, for example, network device #1 111, network device #2 112, and network device #3 113 shown in FIG. 1. The wireless communication system 100 may further include one or more terminal devices, for example, terminal device 121 shown in FIG. 1. The wireless communication system 100 may also support CoMP transmission. In some embodiments, a plurality of cells or a plurality of network devices may coordinately participate in data transmission of a terminal device or jointly receive data sent by a terminal device, or a plurality of cells or a plurality of network devices perform coordinated scheduling or coordinated beamforming. The plurality of cells may belong to a same network device or different network devices, and may be selected based on a channel gain, a path loss, received signal strength, a received signal instruction, or the like.

It should be understood that the network device in the system 100 may be any device having a wireless transceiver function or a chip that can be disposed in the device. The device includes but is not limited to an evolved NodeB (eNB), a radio network controller (RNC), a NodeB (NB), a base station controller (BSC), a base transceiver station (BTS), a home base station (for example, a home evolved NodeB or a home NodeB, HNB), a donor base station (DeNB), and a baseband unit (BBU). The device may alternatively be an access point (AP), a wireless relay node, a wireless backhaul node, a transmission point (TP), a transmission reception point (TRP), or the like in a wireless fidelity (Wi-Fi) system. The device may alternatively be a gNB or a transmission point (TRP or TP) in a 5G system such as an NR system, one or a group of (including a plurality of antenna panels) antenna panels of a base station in the 5G system, a network node that constitutes a gNB or a transmission point, for example, a baseband unit (BBU) or a distributed unit (DU), or the like.

In some deployment, the gNB may include a central unit (CU) and a DU. The gNB may further include a radio frequency unit (RU). The CU implements a part of functions of the gNB, and the DU implements a part of the functions of the gNB. For example, the CU implements functions of a radio resource control (RRC) layer and a packet data convergence protocol (PDCP) layer. The DU implements functions of a radio link control (RLC) layer, a media access control (MAC) layer, and a physical layer (PHY). Information at the RRC layer eventually becomes information at the PHY layer, or is converted from information at the PHY layer. Therefore, in the architecture, higher layer signaling such as RRC layer signaling or PDCP layer signaling may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

It should be further understood that the terminal device in the system 100 may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in embodiments of this application may be a mobile phone, a tablet computer (Pad), a computer having a wireless transceiver function, a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. An application scenario is not limited in embodiments of this application. In this application, the foregoing terminal device and a chip that can be disposed in the foregoing terminal device are collectively referred to as a terminal device.

Optionally, in the communication system 100 shown in FIG. 1, one (for example, network device #1) of network device #1 to network device #3 may be a serving network device. The serving network device may be a network device that provides at least one of an RRC connection, non-access stratum (NAS) mobility management, and security input for the terminal device through a wireless air interface protocol. Optionally, network device #2 and network device #3 may be coordinating network devices. The serving network device may send control signaling to the terminal device, and the coordinating network device may send data to the terminal device. Alternatively, the serving network device may send control signaling to the terminal device, and the serving network device and the coordinating network device may send data to the terminal device. Alternatively, both the serving network device and the coordinating network device may send control signaling to the terminal device, and both the serving network device and the coordinating network device may send data to the terminal device. Alternatively, the coordinating network device may send control signaling to the terminal device, and at least one of the serving network device and the coordinating network device may send data to the terminal device. Alternatively, the coordinating network device may send control signaling and data to the terminal device. This is not particularly limited in embodiments of this application.

Optionally, in the communication system 100 shown in FIG. 1, network device #1 to network device #3 each may be the serving network device.

It should be understood that, for ease of understanding, FIG. 1 schematically shows network device #1 to network device #3 and the terminal device. However, this shall not constitute any limitation on this application. The wireless communication system may further include more or fewer network devices, or may include more terminal devices. Network devices communicating with different terminal devices may be a same network device, or may be different network devices. A quantity of network devices that communicate with different terminal devices may be the same, or may be different. This is not limited in this application.

A hybrid automatic repeat request (HARQ) is a technology combining a forward error correction (FEC) method and an automatic repeat request (ARQ) method. Through the FEC, redundant information is added, so that a receiving end can correct some errors, to reduce retransmissions. The FEC is commonly referred to as redundant channel coding. For an error that cannot be corrected through the FEC, the receiving end requests, by using an ARQ mechanism, a transmitting end to retransmit data. The receiving end detects, by using an error detection code, for example, cyclic redundancy check (CRC), whether an error occurs on a received data packet. If there is no error, an acknowledgement (ACK) is sent. The ACK is usually represented by "1". If there is an error, the receiving end discards the data packet, or stores the data packet for use, where the data packet may be combined with data after the data is retransmitted; and sends a negative acknowledgement (NACK) to the transmitting end. The NACK is usually represented by "0". After receiving the NACK, the transmitting end usually retransmits same data.

This application mainly provides a HARQ codebook generation method for a scenario in which a serving cell is extended to a cell that may include a plurality of downlink carriers, or one carrier includes a plurality of active downlink bandwidth parts, or one time of scheduling may include a plurality of cells or a plurality of downlink carriers. In other words, this application provides a HARQ codebook generation method for a scenario in which one cell may include a plurality of active bandwidth parts, where the plurality of active bandwidth parts may be located on a same carrier in a single cell, or may be located on different carriers in a single cell, or may be located on different carriers in different cells.

For ease of understanding embodiments of this application, before embodiments of this application are described, several nouns or terms used in this application are first briefly described.

1. Physical Downlink Control Channel

The physical downlink control channel (PDCCH) may be used to send downlink scheduling information (DL assignment) to a terminal, so that the terminal receives a physical downlink shared channel (PDSCH). The PDCCH may be further used to send uplink scheduling information (UL Grant) to the terminal, so that the terminal sends a physical uplink shared channel (PUSCH). The PDCCH may be further used to send an aperiodic channel quality indicator (CQI) report request. The PDCCH may be further used to notify a multicast control channel (MCCH) change. The PDCCH may be further used to send an uplink power control command. The PDCCH may be further used for HARQ-related information. The PDCCH may be further used to carry a radio network temporary identifier (RNTI), where the information is implicitly included in cyclic redundancy check (CRC) and the like.

2. Downlink Control Information

Information carried on a PDCCH is referred to as downlink control information (DCI). The downlink DCI may be used to send downlink scheduling assignment information or uplink scheduling information. The DCI has a plurality of formats, and specific information carried in the DCI that is in various DCI formats with different functions varies. For example, format 0 in an LTE system or format 0_0/format 0_1 in an NR system may be used to transmit PUSCH scheduling grant information. For another example, format 1 in the LTE system or format 0_0/format 0_1 in the NR system may be used to transmit PDSCH single-codeword scheduling grant information.

The DCI may indicate cell-level information, and may be scrambled by using a system information radio network temporary identifier (SI-RNTI), a paging radio network temporary identifier (P-RNTI), a random access radio network temporary identifier (RA-RNTI), or the like. The DCI may alternatively indicate terminal-level information, and may be scrambled by using a cell radio network temporary identifier (C-RNTI).

One PDCCH usually carries one piece of DCI that is in a specific format. A cell may schedule a plurality of terminals simultaneously in an uplink and a downlink. In some embodiments, the cell may send a plurality of pieces of scheduling information in each scheduling time unit. Each piece of scheduling information is transmitted on an independent PDCCH. In some embodiments, the cell may simultaneously send a plurality of PDCCHs in each scheduling time unit.

3. Cell

The cell is described by a higher layer from a perspective of resource management, mobility management, or a service unit. Coverage of each network device may be divided into one or more serving cells, and the serving cell may be considered as including a specific frequency domain resource. That is, the serving cell may include a carrier. Actually, in existing LTE and NR, one cell usually includes at least one downlink carrier.

It should be understood that a "cell" in embodiments of this application may be a "serving cell".

Carrier aggregation (CA) means aggregating two or more carriers to support a larger transmission bandwidth. Existing downlink carrier aggregation is also aggregation of a plurality of cells.

A primary cell (PCell) is a cell in which a terminal performs initial connection establishment, or a cell in which a terminal performs RRC connection reestablishment, or a primary cell designated in a handover process.

A secondary cell (SCell) is added during RRC reconfiguration, and is used to provide additional radio resources. A carrier corresponding to the SCell may be referred to as a secondary carrier. A terminal that is configured with carrier aggregation may be connected to one PCell and a plurality of SCells.

Figure 2:
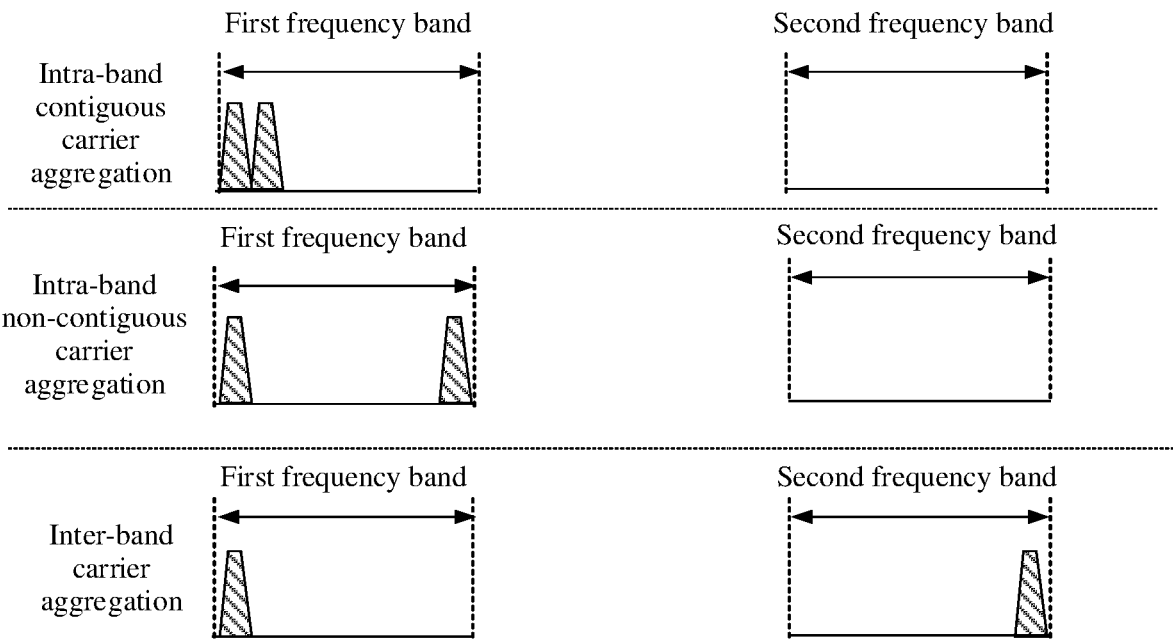
FIG. 2 is a schematic diagram of carrier aggregation applicable to an embodiment of this application.

As shown in FIG. 2, a terminal that is configured with carrier aggregation may be connected to one PCell and a plurality of SCells.

4. Downlink HARQ Codebook

HARQ information is classified into downlink HARQ information and uplink HARQ information. The downlink HARQ information is HARQ information of downlink data (such as a PDSCH) or downlink control information (such as a PDCCH), and may also be referred to as HARQ-ACK information. The uplink HARQ information is HARQ information of uplink data (for example, a PUSCH), and may also be referred to as PUSCH HARQ-ACK information. Embodiments of this application mainly relate to the downlink HARQ information.

The downlink HARQ information is a type of uplink control information (UCI). The UCI may be used to carry at least one of channel state information (CSI) (which may include, for example, one or more of a precoding matrix indicator (PMI), a rank indication (RI), and a channel quality indicator (CQI)), downlink HARQ information, and an uplink scheduling request (SR).

Figure 3:
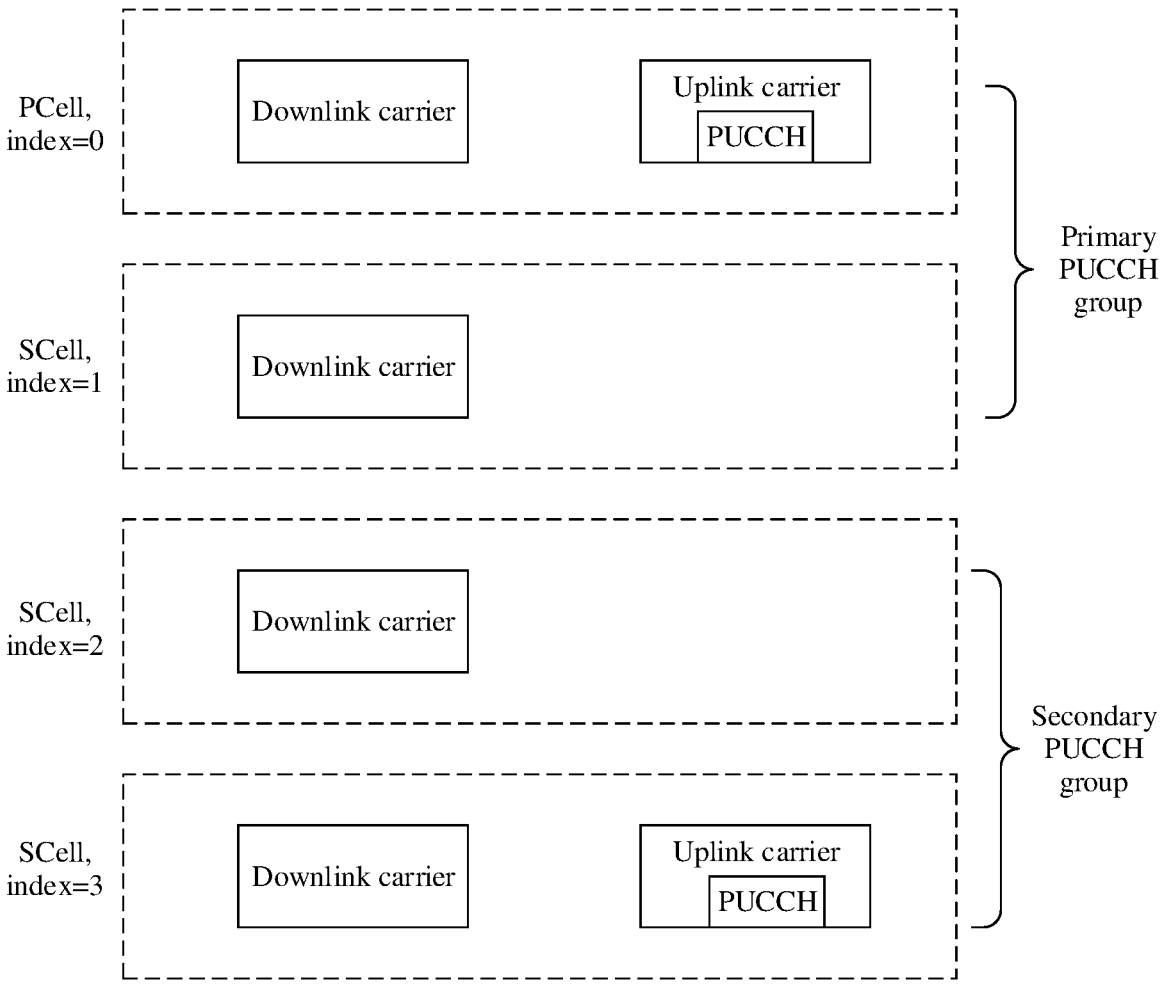
FIG. 3 is a schematic diagram of a serving cell, a carrier, and a PUCCH group that are applicable to an embodiment of this application.

Usually, the downlink HARQ information is sent on a physical uplink control channel (PUCCH), and may alternatively be sent on a PUSCH when a specific condition is met. In a carrier aggregation scenario, because an uplink carrier aggregation capability on a terminal side is limited, HARQ information of downlink data on a plurality of downlink carriers can be fed back on a few uplink carriers. When a terminal does not have the uplink carrier aggregation capability (that is, the terminal supports uplink single-carrier sending), PDSCHs on a plurality of carriers feed back HARQ-ACK information through a PUCCH on an uplink primary carrier. When a terminal has the uplink carrier aggregation capability, downlink carriers may be grouped, and a PUCCH on an uplink carrier is used for each group of downlink carriers to feed back HARQ-ACK information. Each group corresponds to one PUCCH. Therefore, each group may also be referred to as a PUCCH group. A PUCCH group including a primary carrier may be referred to as a primary PUCCH group, and another PUCCH group is referred to as a secondary PUCCH group. FIG. 3 is a schematic diagram of a cell, a carrier, and a PUCCH group. In FIG. 3, one PCell and three SCells are used as an example for description.

Figure 4:
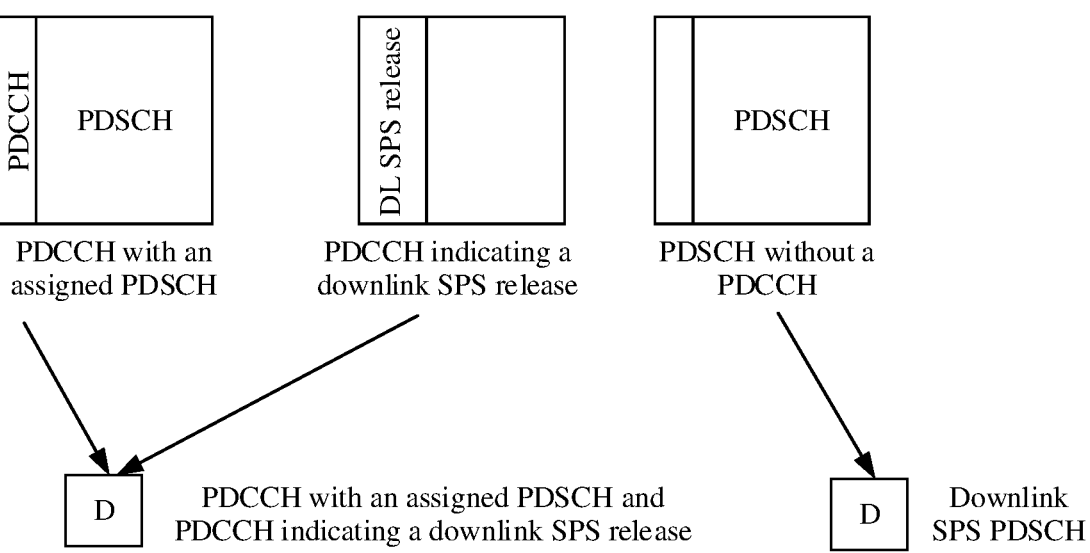
FIG. 4 is a schematic diagram of types of downlink data that requires a HARQ feedback applicable to an embodiment of this application.

A HARQ codebook may be understood as a HARQ information bit sent on a PUCCH resource or a PUSCH resource. For example, the HARQ codebook includes a size (namely, a quantity of HARQ information bits) of the codebook and a sequence. FIG. 4 shows types of downlink data that requires a HARQ feedback. As shown in FIG. 4, the types of downlink data for which HARQ information is to be fed back include a PDSCH having a corresponding PDCCH, a semi-persistent scheduling (SPS) PDSCH, a downlink SPS release, and a PDCCH indicating an SCell dormancy indication and having no data scheduling, where the downlink SPS release may also be referred to as an SPS PDSCH release. For ease of description, the first two types of downlink data are collectively referred to as PDSCH data, and the SPS PDSCH release and the SCell dormancy indication, as special downlink data, are not described separately.

5. FEC Coding

If a receiving end cannot correctly decode data sent by a transmitting end once, the receiving end may discard the data packet and request retransmission. Although these data packets cannot be correctly decoded, useful information is still included in the data packets. If the data packets are discarded, the useful information is lost. By using a HARQ with soft combining, a received erroneous data packet is stored in a HARQ buffer, and is combined with a subsequently received retransmitted data packet, to obtain a data packet that is more reliable than a data packet that is separately decoded (this is known as a "soft combining" process). Then, the combined data packet is decoded. If decoding still fails, a process of "requesting retransmission, and then performing soft combination" is repeated.

The HARQ with soft combining is classified into chase combining and incremental redundancy depending on whether retransmitted bit information is the same as bit information in an original transmission. Retransmitted bit information in the chase combining is the same as bit information in an original transmission. Retransmitted bit information in the incremental redundancy does not need to be the same as bit information in an original transmission. In the incremental redundancy, each retransmission does not need to be the same as an initial transmission. Instead, a plurality of coded bit sets are generated, and each set carries same information. When retransmission is required, a coded bit set different from a previous coded bit set is usually transmitted, and the receiving end combines retransmitted data with previously transmitted data. A coded bit set in each retransmission is referred to as a redundancy version (RV).

After primary encoding (polar encoding or LDPC encoding) is performed, systematic bits, first parity bits, and second parity bits are output. These outputs are interleaved and then inserted into a circular buffer. The systematic bits are inserted first, and then the first parity bits and the second parity bits are inserted alternately. Different RVs are data segments that are obtained through encoding and that have different start locations in the circular buffer.

6. Numerology

The numerology may refer to a set of parameters, including a subcarrier spacing (SCS), a symbol length, a slot length, a cyclic prefix (CP) length, and the like. In NR, a new feature is that a plurality of numerologies may be mixed and used at the same time. The numerology is defined by using an SCS and a CP. Table 1 shows the plurality of numerologies that can be currently supported in an NR system.

TABLE 1

| $\mu$ | $\Delta f = 2^{\mu}*15$ (kHz) | CP |
|---|---|---|
| 0 | 15 | Normal (Normal) |
| 1 | 30 | Normal |

TABLE 1-continued

| $\mu$ | $\Delta f = 2^{\mu}*15$ (kHz) | CP |
|---|---|---|
| 2 | 60 | Normal, and extended (Extended) |
| 3 | 120 | Normal |
| 4 | 240 | Normal |

Specifically, it can be learned from Table 1 that $\mu$ may be used to represent different numerologies. It can be learned from Table 1 that at least four different numerologies, namely, $\mu=0$, $\mu=1$, $\mu=2$, $\mu=3$, and $\mu=4$, are included. In embodiments of this application, $\mu$ is denoted as $\mu0$, $\mu1$, $\mu2$, $\mu3$, and $\mu4$ for differentiation. When $\mu=0$, $SCS=2^{\mu}*15=2^{0}*15=15$ kHz. When $\mu=1$, $SCS=2^{\mu}*15=2^{1}*15=30$ kHz. When $\mu=2$, $SCS=2^{\mu}*15=2^{2}*15=60$ kHz. When $\mu=3$, $SCS=2^{\mu}*15=2^{3}*15=120$ kHz. When $\mu=4$, $SCS=2^{\mu}*15=2^{4}*15=240$ kHz.

7. Bandwidth Part

Figure 5:
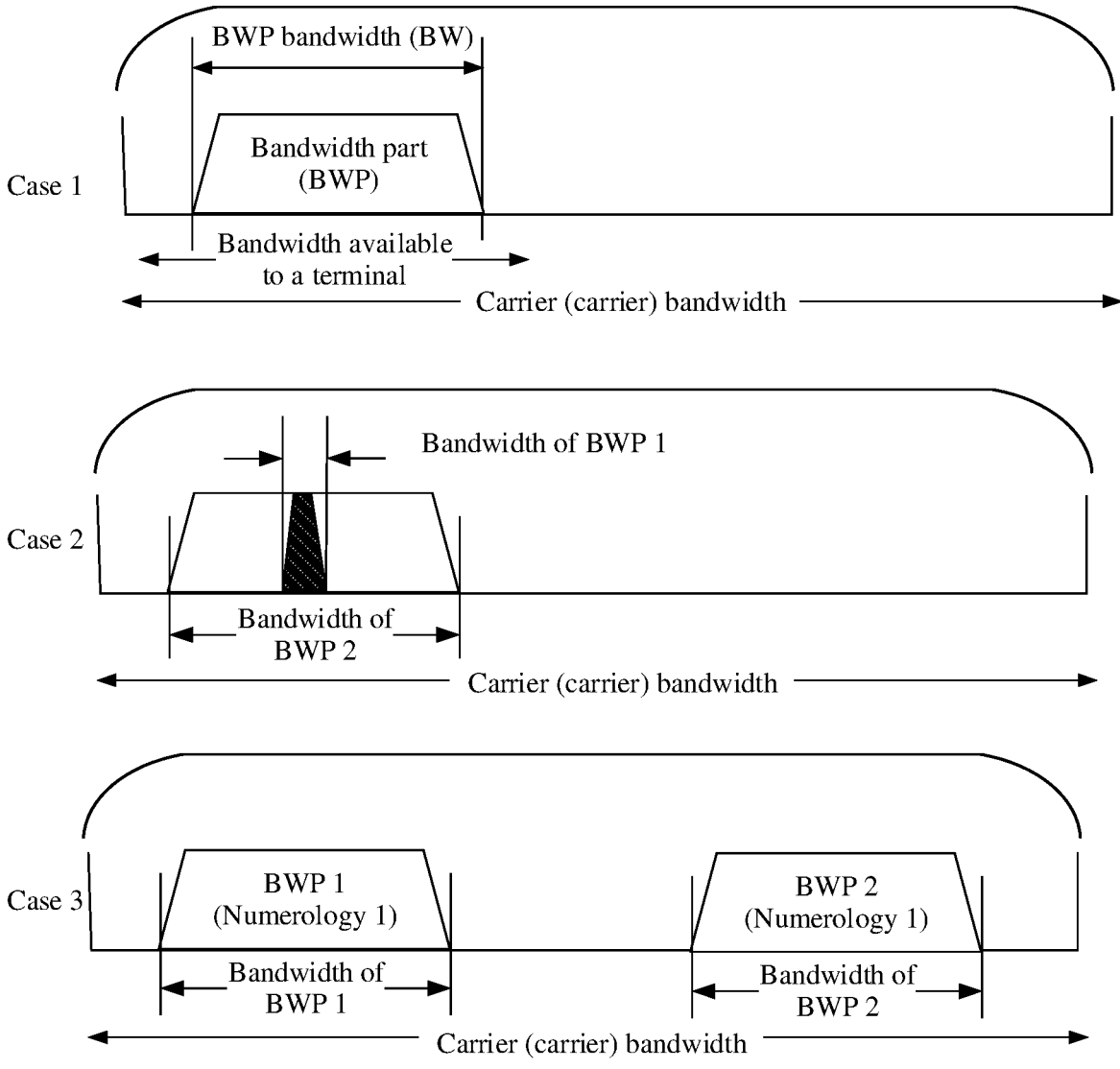
FIG. 5 is a schematic diagram of a BWP applicable to an embodiment of this application.

In NR, a bandwidth of a carrier of a base station is wider than a bandwidth of an LTE carrier. For example, a carrier bandwidth of NR may be 100 MHz. However, different terminals have different radio frequency capabilities and can support different maximum bandwidths. Therefore, a concept of the bandwidth part (BWP) is introduced. FIG. 5 is a schematic diagram of a BWP. The BWP is a group of contiguous RB resources on a carrier. Different BWPs may occupy frequency domain resources that partially overlap but have different bandwidths, or may be bandwidth resources that have different numerologies but may not overlap with each other in frequency domain. In NR Rel-15, a serving cell may configure a maximum of four BWPs for a terminal device. For example, there are four BWPs in both an uplink and a downlink in frequency division duplex (FDD), and there are a total of four BWP pairs in an uplink and a downlink in time division duplex (TDD). Each BWP pair includes an uplink BWP and a downlink BWP. One BWP can be activated on a carrier of each serving cell at a same time, and the terminal sends and receives data on the active BWP.

8. HARQ Information Space Bundling

The HARQ information space bundling means that when two transport blocks are sent in a single cell in one downlink time unit, logical "AND" processing is performed on HARQ information corresponding to the two transport blocks, to obtain one-bit HARQ information.

How to generate a HARQ codebook is a main concern of this application in a scenario in which a plurality of cells may be used to transmit downlink data, the plurality of cells may have different carriers, and the downlink data may be located in different cells or on different carriers.

It should be specially noted that, in embodiments of this application, "carrier Y", "cell Y", and "cell index=Y" are often interchangeably used, but a person skilled in the art can understand meanings of "carrier Y", "cell Y", and "cell index=Y". "Carrier Y", "cell Y", or "cell index=Y" may all indicate that an index number or an identifier of a cell/carrier is Y, where Y may be 0, 1, 2, . . . , or the like. For example, cell 0 or cell index=0 indicates that an index number or an identifier of a cell is 0, or carrier 0 or carrier=0 indicates an index number or an identifier of a carrier. For example, when a quantity of carriers in a cell is 1, carrier 0 may be understood as or also indicate cell 0.

It should be further noted that, in embodiments of this application, a "protocol" may be a standard protocol in the communication field, for example, may include an LTE protocol, an NR protocol, and a related protocol applied to a future communication system. This is not limited in this application.

It should be further noted that in embodiments of this application, terms "network" and "system" are usually interchangeably used, but a person skilled in the art can understand meanings of the terms. Terms "component carrier", "carrier unit", and "carrier" are usually interchangeably used, but a person skilled in the art can understand meanings of the terms. "Information", "signal", "message", and "channel" may be interchangeably used sometimes. It should be noted that meanings expressed by the terms are consistent when differences of the terms are not emphasized. Terms "of" and "corresponding (relevant)" may be interchangeably used sometimes. It should be noted that meanings expressed by the terms are consistent when differences of the terms are not emphasized.

It should be further noted that in embodiments of this application, "identifier (ID)" and "index" are usually interchangeably used, but a person skilled in the art can understand meanings of the terms. It should be noted that meanings expressed by the terms are consistent when differences of the terms are not emphasized.

It should be further noted that in embodiments of this application, "at least one" may mean "one or more". For example, that at least one of manner A, manner B, or manner C is used for implementation means that manner A may be used for implementation, manner B may be used for implementation, or manner C may be used for implementation; or may mean that manner A and manner B may be used for implementation, manner B and manner C may be used for implementation, or manner A and manner C may be used for implementation; or may mean that manner A, manner B, and manner C may be used for implementation. Similarly, "at least two" may mean "two or more".

It should be further noted that in embodiments below, "first", "second", "third", and the like are intended to distinguish between different objects, but should not constitute any limitation on this application.

It should be noted that the term "and/or" describes an association relationship between associated objects and represents that three relationships may exist. For example, A and/or B may represent the following three cases: Only A exists, both A and B exist, and only B exists. The character "/" usually indicates an "or" relationship between the associated objects. "At least one", similar to "A and/or B", describes an association relationship between associated objects and represents that three relationships may exist. For example, at least one of A and B may represent the following three cases: Only A exists, both A and B exist, and only B exists. The following describes in detail the technical solutions provided in this application with reference to the accompanying drawings.

It should be understood that a hybrid automatic repeat request HARQ codebook generation method provided in this application is applicable to a wireless communication system such as the wireless communication system 100 shown in FIG. 1. A terminal device in embodiments of this application may simultaneously communicate with one or more network devices. For example, a network device in embodiments of this application may correspond to any one or more of network device #1 111, network device #2 112, and network device #3 113 in FIG. 1. The terminal device in embodiments of this application may correspond to terminal device 121 in FIG. 1.

Without loss of generality, the following describes embodiments of this application in detail by using an interaction process between one terminal device and one network device as an example. The terminal device may be any terminal device that is in a wireless communication system and that has a wireless connection relationship with one or more network devices. It may be understood that the terminal device in the wireless communication system may implement wireless communication based on a same technical solution. This is not limited in this application.

Figure 6:
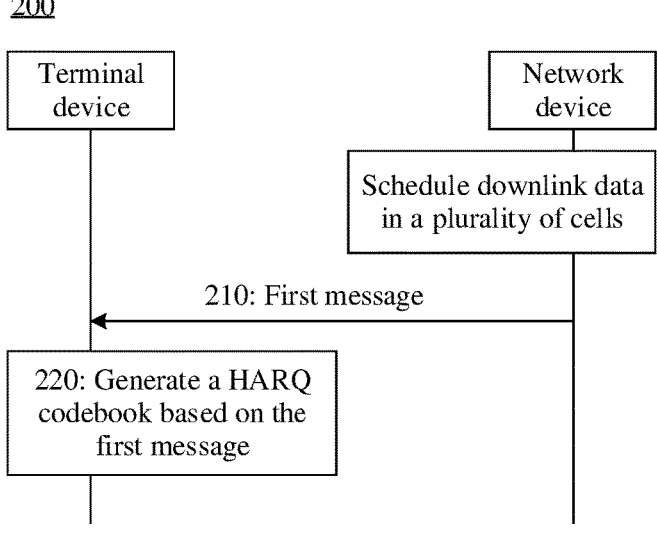
FIG. 6 is a schematic interaction diagram of a HARQ codebook generation method applicable to an embodiment of this application.

FIG. 6 is a schematic flowchart, shown from a perspective of device interaction, of a method 200 for generating a hybrid automatic repeat request HARQ codebook according to an embodiment of this application. As shown in the figure, the method 200 shown in FIG. 6 may include step 210 and step 220. The following describes the method 200 in detail with reference to FIG. 6.

210: Receive a first message from a network device, where the first message is for scheduling downlink data in a plurality of cells.

220: Generate a HARQ codebook based on the first message.

It may be understood that the foregoing method may be described based on a case in which a terminal device is an execution body. Accordingly, the network device sends the first message to the terminal device, and receives the HARQ codebook from the terminal device.

When configuring a plurality of cells for the terminal device, the network device may use the plurality of cells as a cell combination, and the cell combination may correspond to a same parameter or different parameters. In other words, based on the cell combination, the terminal device may generate feedback information corresponding to the cell combination. Optionally, related information may be the parameter of the corresponding cell combination.

A cell may include one or more carrier combinations. The cell may include one or more carriers. A plurality of cell combinations may be understood as that each combination includes one or more carriers, or a part of combinations include one or more carriers.

Optionally, at least two cells or carriers in the cell combination are used to transmit a same transport block or different transport blocks. Without loss of generality, in this embodiment, cell #1 and cell #2 are used as an example for description. Alternatively, carrier 1 in cell #1 and carrier 2 in cell #2 are used as an example for description.

It should be noted that time in this embodiment of this application may be a time unit, namely, a subframe, a mini-subframe, a slot, a mini-slot, an orthogonal frequency division multiplexing (OFDM) symbol, a time unit smaller than an OFDM symbol, or a time unit larger than a subframe. This is not limited in this application.

Optionally, a plurality of carriers in the cell combination are located on different carriers of the cell.

Optionally, in some embodiments, the HARQ codebook may be reported by the terminal device to the network device as a capability, or the network device may configure one or more HARQ codebook feedback manners for the terminal device based on a capability reported by the terminal device.

The following describes in detail the HARQ codebook generation method according to embodiments of this application with reference to the cell combination.

Figure 7:
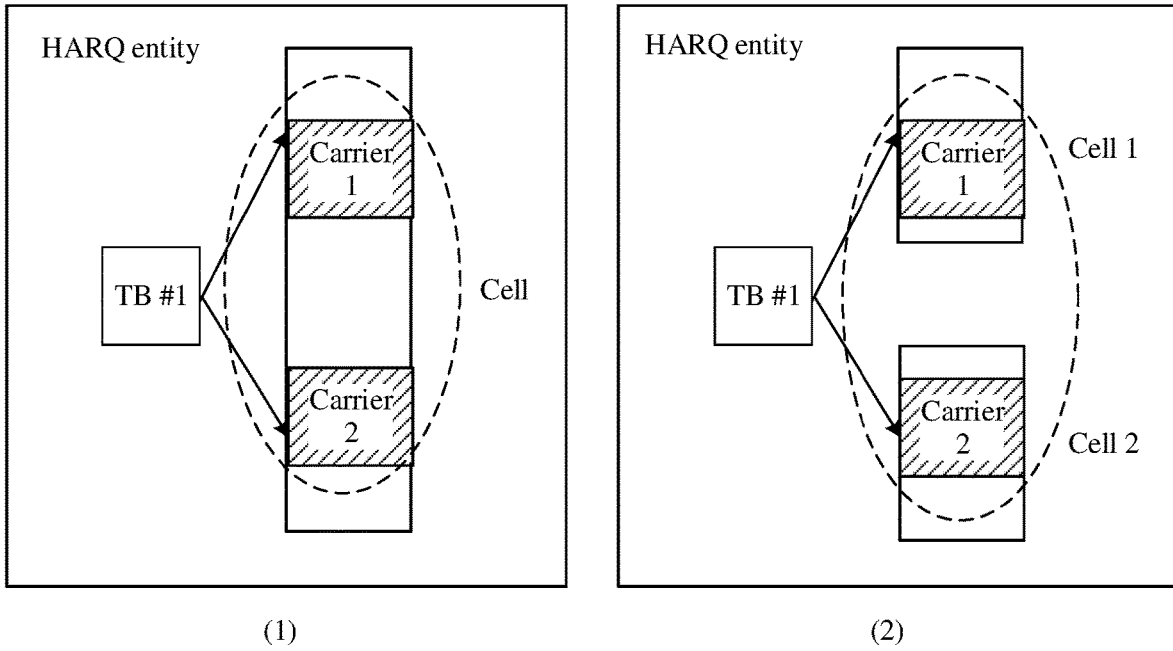
FIG. 7 is a schematic diagram of a carrier combination applicable to an embodiment of this application.

FIG. 7 is a schematic diagram of a cell combination or a carrier combination. As shown in FIG. 7, TB #1 is sent on carrier #1 and carrier #2, and carrier #1 and carrier #2 constitute a carrier combination. Carrier #1 and carrier #2 may be located in a same cell. As shown in (1) in FIG. 7, carrier #1 and carrier #2 are located in cell 1. Alternatively, carrier #1 and carrier #2 may be located in different cells. As shown in (2) in FIG. 7, carrier #1 is located in cell 1, and carrier #2 is located in cell 2.

Both carrier #1 and carrier #2 carry data related to TB #1. Specifically, when one TB #1 is sent by using one carrier combination, at least one of the following two manners may be used for implementation.

In some embodiments, a PDSCH may be used to carry TB-related data. For example, PDSCH 1 is used to carry data of TB 1, and PDSCH 2 is used to carry data of TB 2.

Optionally, in joint scheduling in this embodiment, different PDSCHs may have a same numerology or different numerologies.

Manner 1

TB #1 is divided into a plurality of bits through encoding, and the plurality of bits may be separately sent in the carrier combination.

Figure 8:
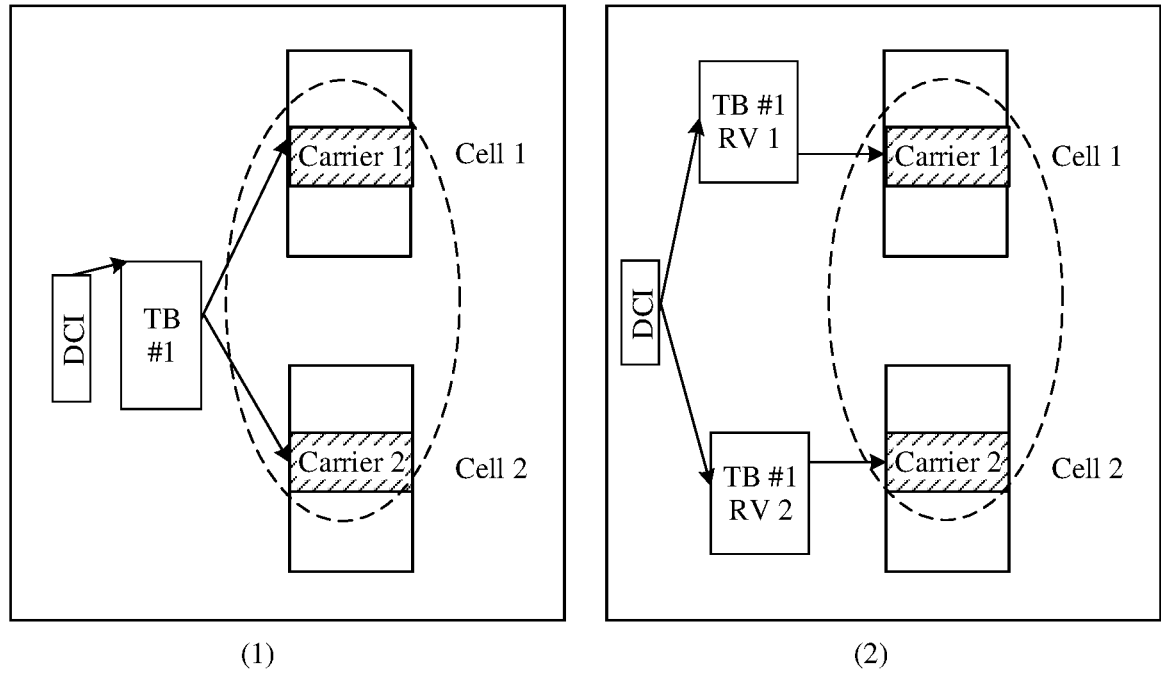
FIG. 8 is a schematic diagram of a carrier combination sending a transport block applicable to an embodiment of this application.

For details, refer to (1) in FIG. 8. It is assumed that TB #1 is sent on carrier #1 and carrier #2. TB #1 is divided into two parts through encoding (for example, P bits are obtained through encoding, and the P bits are divided into two parts: P1 and P2, where P1+P2=P), where the two parts are denoted as part #1 and part #2, part #1 is sent on carrier #1, and part #2 is sent on carrier #2.

It should be noted that an example in which TB #1 is divided into two parts through encoding is used for description above. This application is not limited thereto. For example, it is assumed that TB #1 is divided into part #1, part #2, and part #3 through encoding. In this case, part #1 and part #2 may be sent on carrier #1, and part #3 may be sent on carrier #2. Alternatively, part #1 is sent on carrier #1, and part #2 and part #3 are sent on carrier #2.

It should be further noted that the foregoing uses two carriers as an example for description. This application is not limited thereto. For example, a cell combination includes a plurality of carriers, and all or a part of data obtained through encoding of TB #1 may be transmitted on each carrier.

It should be further noted that, in manner 1, the transmitted TB is scheduled by using one piece of DCI. Refer to (1) in FIG. 8. The DCI includes one piece of RV information. Transmission in the foregoing carrier combination may be considered as a whole. Therefore, one piece of HARQ information is to be fed back.

Manner 2

TB #1 is encoded by using different RVs, and is separately sent on a plurality of configured carriers.

For details, refer to (2) in FIG. 8. It is assumed that TB #1 is sent on carrier #1 and carrier #2. Data #1 is obtained through encoding performed on TB #1 by using RV 1, and data #1 is sent on carrier #1. Data #2 is obtained through encoding performed on TB #1 by using RV 2, and data #2 is sent on carrier #2.

It should be noted that an example in which TB #1 is encoded by using two different RVs is used for description above. This application is not limited thereto. For example, it is assumed that TB #1 may be separately encoded by using RV 1, RV 2, and RV 3. In this case, TB #1 may be encoded by using RV 1 and RV 2 and then sent on carrier #1, and TB #1 is encoded by using RV 3 and then sent on carrier #2. Alternatively, TB #1 may be encoded by using RV 1 and then sent on carrier #1, and TB #1 is encoded by using RV 2 and RV 3 and then sent on carrier #2.

It should be noted that the foregoing uses two carriers as an example for description. This application is not limited thereto. For example, a cell combination includes more than two carriers, and TB #1 may be encoded by using different redundancy versions, and separately sent on the carriers.

It should be further noted that, in manner 2, one piece of DCI simultaneously schedules a plurality of pieces of RV data of the TB, and data of one RV version is sent on each carrier. In this case, the data on each carrier may have separate HARQ information or same HARQ information.

A manner of generating the HARQ codebook includes a semi-persistent HARQ codebook and a dynamic HARQ codebook. The following separately describes a manner of generating the semi-persistent HARQ codebook and a manner of generating the dynamic HARQ codebook. It should be noted that the HARQ codebook includes at least one piece of HARQ information, for example, may be generated based on one feedback of the terminal device. For the dynamic codebook, the HARQ information may be specific to a scheduled PDSCH. For the semi-persistent codebook, the HARQ information may be specific to a candidate PDSCH. In some embodiments, the HARQ codebook may also be referred to as a HARQ-ACK codebook. The HARQ codebook and the HARQ-ACK codebook are not distinguished from each other below.

In some embodiments, two scenarios, namely, joint scheduling and single-carrier scheduling are distinguished from each other. For example, the joint scheduling means scheduling downlink data in a plurality of cells or a plurality of carriers by using one piece of DCI or one RRC message. The single-carrier scheduling includes intra-carrier scheduling and inter-carrier scheduling, and means scheduling downlink data in one cell or one carrier by using one piece of DCI or one RRC message.

Semi-Persistent HARQ Codebook:

The semi-persistent HARQ codebook is a codebook generation mode in which a size of a HARQ codebook may be determined before data is sent and does not change when actual data sending changes. The size of the codebook may be determined based on some RRC parameter configurations or predefined parameters.

The semi-persistent HARQ codebook is generated in the following manner.

Step 1: For a carrier in a given serving cell, determine a candidate PDSCH receiving occasion set.

It should be understood that in this embodiment of this application, PDSCHs at all possible locations may be used as candidate PDSCHs, and the candidate PDSCHs include a set of various candidate PDSCHs that are in all search space and that are configured by a network device.

Determining of the candidate PDSCH receiving occasion set is related at least to the following factors.

(1) A K1 value set associated with an uplink carrier.

Figure 9A:
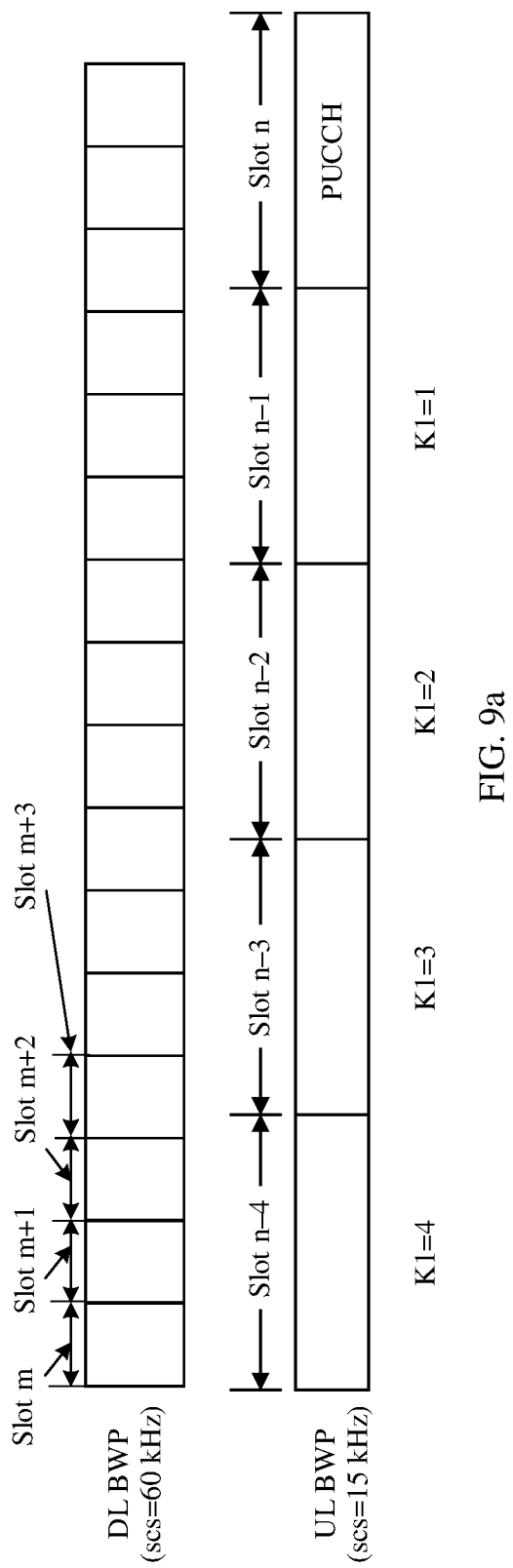
FIG. 9a is a schematic diagram of uplink and downlink semi-static configuration applicable to an embodiment of this application.

A K1 value is related to a DCI format that the terminal device is configured to monitor. FIG. 9a is a schematic diagram of K1 values. A slot timing value K1 may also be referred to as a timing value from downlink data to feedback information of the downlink data, and indicates a quantity of slots between the downlink data and the HARQ feedback information of the downlink data. For example, a PUCCH for feeding back HARQ information is located in slot n. K1=1 indicates that the PUCCH in slot n is to include HARQ feedback information of a PDSCH that is in slot n−1. The rest may be deduced by analogy. K1=2, 3, or 4 respectively indicates that the PUCCH in slot n is to include HARQ feedback information of PDSCHs that are in slots n−2, n−3, and n−4. It should be noted that when a numerology of a DL BWP is different from a numerology of a UL BWP, as shown in FIG. 9a, a slot unit corresponding to a K1 value is consistent with a slot unit of an uplink carrier, that is, K1=1 corresponds to one slot corresponding to the uplink carrier. In the figure, the slot of the uplink carrier corresponds to a plurality of slots of a downlink carrier. As shown in the figure, a slot corresponding to K1=4 corresponds to four slots: slot m, slot m+1, slot m+2, and slot m+3. When the terminal is configured to monitor DCI format 1_0, the K1 value set is a predefined set {1, 2, 3, 4, 5, 6, 7, 8}. When the terminal is configured to monitor DCI format 1_1, the K1 value set is determined based on an RRC configuration parameter.

(2) PDSCH time domain resource allocation table (an RRC configuration parameter associated with a downlink carrier). Main components of the time domain allocation table are shown in Table 2 below. In the table, a parameter set for PDSCH time domain allocation is defined. Parameters in each row include a slot offset value K0 between a PDCCH and a PDSCH, a PDSCH start symbol, a symbol length, and a PDSCH mapping type.

TABLE 2

| Index (index) | K0 | Start symbol (start symbol) | Symbol length | Type (type) |
|---|---|---|---|---|
| 0 | 0 | 0 | 7 | A |
| 1 | 0 | 3 | 2 | B |
| 2 | 0 | 4 | 2 | B |
| 3 | 1 | 5 | 2 | B |
| 4 | 1 | 5 | 4 | B |
| 5 | 0 | 7 | 7 | B |

(3) Uplink and downlink semi-persistent configuration (including cell-level configuration and terminal-specific configuration).

Figure 9B:
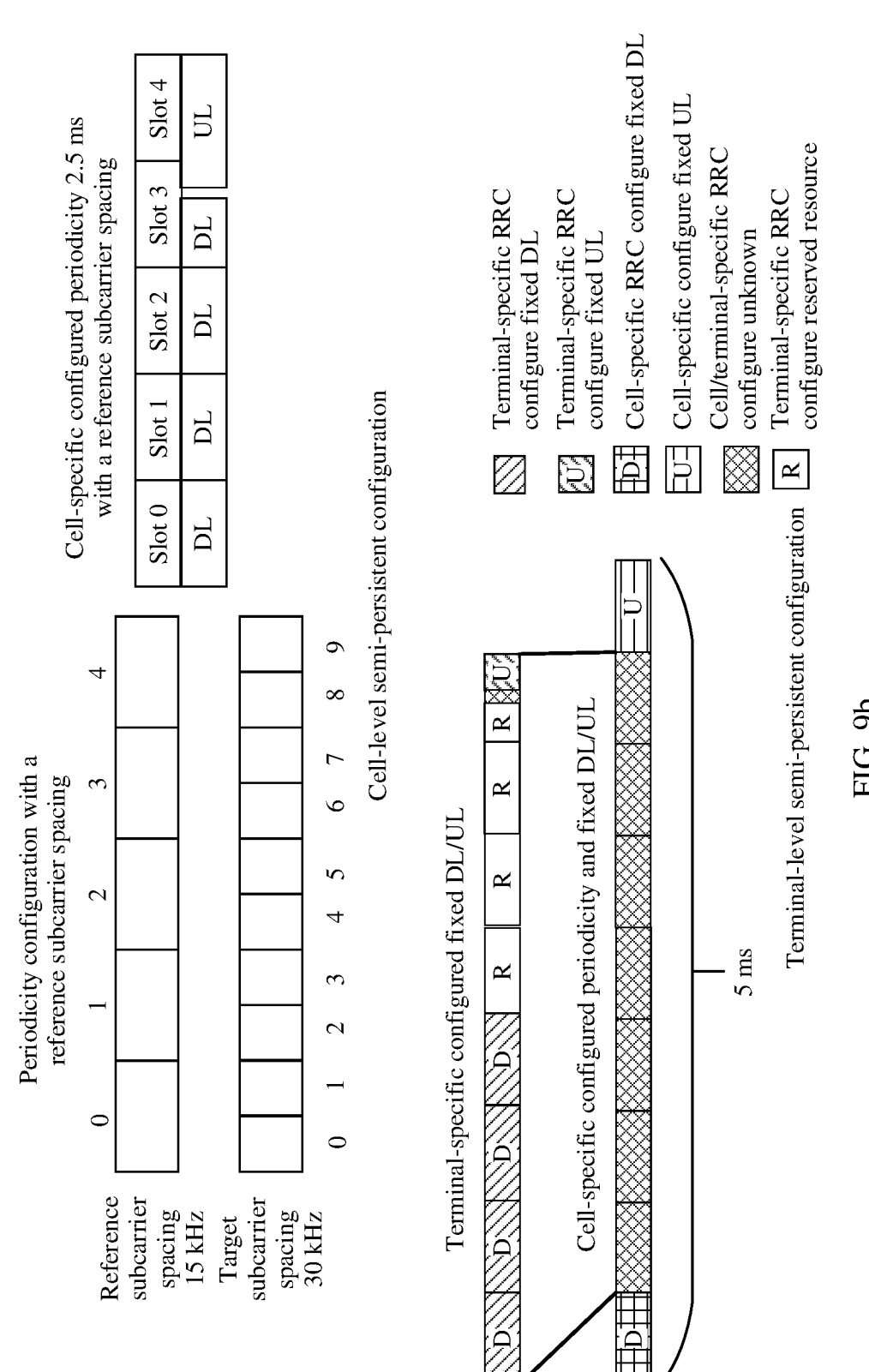
FIG. 9b is a schematic diagram of semi-persistent codebook configuration applicable to an embodiment of this application.

FIG. 9b is a schematic diagram of uplink and downlink semi-persistent configuration, including cell-level semi-persistent configuration and terminal-level semi-persistent configuration. In an NR system, to support flexible and dynamic TDD, a DL/UL transmission direction in each time unit (a slot, a symbol, or the like) may be configured by using higher layer signaling and/or physical layer group common DCI. In a possible implementation, a periodicity is configured. For example, in cell-level configuration shown at the top in FIG. 9b, a periodicity of 2.5 ms is configured, and a slot length corresponding to five 30 kHz subcarrier spacings is occupied; and as shown in the two sub-figures below, a periodicity of 5 ms is configured. In this periodicity, some fixed time units may be configured for uplink UL transmission, some fixed time units may be configured for downlink DL transmission, or some reserved resources may be configured. Remaining resources/time units in the periodicity may be flexibly and dynamically assigned as DL or UL or reserved/blank resources. As shown in FIG. 9b, a DL time unit and a UL time unit are configured in the cell-level configuration shown in the middle, and other resources are reserved resources. A specific quantity of DL time units and UL time units are configured in terminal-level configuration. The reserved resource may also be referred to as an unknown resource.

The candidate PDSCH receiving occasion set determined in each carrier is related to the parameters in the foregoing factors (1), (2), and (3). First, a time unit set in which a candidate PDSCH is located is preliminarily determined based on the K1 value set. Then, a time unit that is determined by using a specific parameter in the PDSCH slot allocation table and that may carry a PDSCH is compared with a time unit that is fixedly used for uplink transmission and that is in the uplink and downlink semi-persistent configuration. A time unit that is in time units that may carry the PDSCH and that has been configured as an uplink time unit is removed. Finally, the candidate PDSCH receiving occasion set is obtained. Optionally, for the joint scheduling, a candidate PDSCH receiving occasion set on a scheduling carrier or a scheduled carrier is determined based on the parameters in the foregoing factors (1), (2), and (3). For example, the candidate PDSCH receiving occasion set on the scheduling carrier or the scheduled carrier may be determined based on parameter configurations in the foregoing factors (1), (2), and (3) corresponding to an active downlink BWP on the scheduling carrier, or may be determined based on parameter configurations in the foregoing factors (1), (2), and (3) corresponding to active downlink BWPs on a plurality of carriers, where the parameter configurations are the same.

Step 2: HARQ information of each serving cell is determined in sequence based on a serving cell sequence, and a final HARQ codebook is generated when HARQ information of all serving cells is determined. For a terminal that is configured with CA, a quantity of serving cells is greater than or equal to 2. For a terminal that is not configured with CA, a quantity of serving cells is 1.

In addition to a size of the candidate PDSCH receiving occasion set in step 1, the size of the HARQ codebook is also related to a quantity of serving cells configured for the terminal, whether HARQ information space bundling is configured, a maximum quantity of codewords (CWs) that can be scheduled by each piece of DCI (which is equivalent to a maximum quantity of transport blocks that can be scheduled in a single time unit), whether a CBG transmission mode is configured, and a quantity of code block groups (CBGs) included in a next transport block (TB) in the CBG transmission mode. In this embodiment of this application, for clarity, parameters related to HARQ codebook determining are collectively referred to as parameter #A (namely, an example of parameters corresponding to a BWP combination). The parameter #A includes the foregoing K1 value set parameter, the time domain allocation table, the uplink and downlink semi-persistent configuration, the maximum quantity of CWs supported by the DCI, the quantity of CBGs, whether the space bundling is performed, and the like.

The foregoing manner of generating the semi-persistent HARQ codebook is related to a case in which data scheduled by using a piece of DCI is mapped to a downlink carrier in a cell. In a joint scheduling scenario, for example, when the network device schedules downlink data of the terminal device in a plurality of cells by using one piece of DCI, the following describes how to generate the semi-persistent HARQ codebook when a cell combination is configured in a manner in which at least one TB is sent on a plurality of carriers in the cell combination.

In some embodiments, the first message is an RRC message. Specifically, the terminal device determines a PDSCH of a first cell and/or a PDSCH of a second cell based on the RRC message. The following provides detailed descriptions.

Optionally, that the terminal device generates a HARQ codebook based on the first message includes:

The terminal device determines a first PDSCH of the first cell based on the RRC message.

The terminal device determines a PDSCH receiving occasion set based on the first PDSCH of the first cell.

The terminal device determines the HARQ codebook based on the PDSCH receiving occasion set.

A person skilled in the art may understand that the HARQ codebook includes HARQ information corresponding to the first PDSCH and HARQ information corresponding to a second PDSCH of the second cell. There may be one or more pieces of HARQ information in the HARQ codebook. For example, one piece of HARQ information may correspond to the first PDSCH and the second PDSCH. Alternatively, at least two pieces of HARQ information may respectively correspond to the first PDSCH and the second PDSCH.

Optionally, that the terminal device generates a HARQ codebook based on the first message includes:

The terminal device determines a first PDSCH of the first cell and the PDSCH of the second cell based on the RRC message.

The terminal device determines a PDSCH receiving occasion set based on the first PDSCH of the first cell and the PDSCH of the second cell.

The terminal device determines the HARQ codebook based on the PDSCH receiving occasion set, where the HARQ codebook includes first HARQ information corresponding to the first PDSCH and second HARQ information corresponding to the second PDSCH. At least one of the first HARQ information and the second HARQ information is valid. It may be understood that one of the first HARQ and the second HARQ is valid.

Specifically, the terminal device and the network device may identify, according to a unified rule or definition, that one of the first HARQ information or the second HARQ information is valid information, and the other is invalid information. Alternatively, the terminal device or the network device may set one of the first HARQ information or the second HARQ information to be valid, so that a receiver can ignore the other one of the first HARQ information and the second HARQ information.

Optionally, that the terminal device generates a HARQ codebook based on the first message includes:

The terminal device determines a first PDSCH of the first cell and the PDSCH of the second cell based on the RRC message.

The terminal device determines a PDSCH receiving occasion set based on the first PDSCH of the first cell and the PDSCH of the second cell.

The terminal device determines the HARQ codebook based on the PDSCH receiving occasion set, where the HARQ codebook includes first HARQ information corresponding to the first PDSCH and second HARQ information corresponding to the second PDSCH. The first HARQ information is the same as the second HARQ information.

The following describes how to generate the semi-persistent HARQ codebook in two cases.

Case 1

For example, two downlink cells are configured for one terminal device. The network device sends indication information to the terminal device in cell 1, to schedule the terminal device to receive, in cell 1 and cell 2, downlink data sent by the network device. The downlink data is carried in different TBs. The following uses an example in which the downlink data is transmitted on the first PDSCH of cell 1 and the second PDSCH of cell 2 for description. Optionally, cell 1 has carrier 1 for transmitting the first PDSCH, and cell 2 has carrier 2 for transmitting the second PDSCH.

It may be understood that cell 1/carrier 1 may be a cell/carrier via which the terminal device receives DCI or via which the network device sends DCI, or may be referred to as a scheduling cell/carrier. Accordingly, a cell/carrier via which the terminal device receives a PDSCH or a cell/carrier via which the network sends a PDSCH may be referred to as a scheduled cell/carrier. Further, the following lists different scenarios.

The DCI and the PDSCH may be located in a same cell, or may be located in different cells.

The DCI and the PDSCH may be located on different carriers of different cells, or may be located on different carriers of a same cell.

A plurality of PDSCHs may be located in a same cell, or located in different cells.

A plurality of PDSCHs may be located on different carriers of different cells, or may be located on different carriers of a same cell.

Specifically, the semi-persistent HARQ codebook may be determined by using at least the following methods.

Method #1

For two PDSCHs that are scheduled by using one piece of DCI and that are mapped to different carriers, an HARQ-ACK is fed back for each of the two PDSCHs. Optionally, content of the first PDSCH and the second PDSCH that are respectively mapped to carrier 1 and carrier 2 may be different, that is, TBs are different. In this case, according to the multi-carrier semi-persistent HARQ codebook generation method described above, the HARQ codebook may be separately generated based on each carrier, and finally HARQ-ACK information of all carriers is jointly fed back.

Method #2

Joint feedback is required for two PDSCHs mapped to different carriers in one piece of DCI. Optionally, the first PDSCH and the second PDSCH correspond to different content, but RV version numbers and new transmission/retransmission indications are the same. That is, different TBs use a same RV version number and a same new transmission/retransmission indication. Alternatively, the first PDSCH and the second PDSCH have same content, but RV version numbers may be different. That is, a same TB corresponds to different RV versions. Specifically, HARQ-ACK information of the PDSCHs corresponding to the two carriers is fed back with a same value. The following several manners are included.

Manner 1:

Only one piece of HARQ-ACK information is fed back for the second PDSCH on the two carriers. Optionally, the terminal device and the network device uniformly predefine the following rule.

When determining a PDSCH candidate set, the terminal device and the network device calculate only a PDSCH candidate set on the scheduling carrier, namely, a carrier on which the DCI is sent, and do not calculate a PDSCH candidate set on the scheduled carrier. In this case, the two PDSCHs in the DCI share HARQ-ACK information corresponding to the PDSCHs on the scheduling carrier, and the terminal device feeds back the HARQ-ACK information at a PDSCH candidate location corresponding to the scheduling carrier. A person skilled in the art may understand that there may be one or more PDSCHs on the scheduling carrier. For example, when an SCS of the scheduling carrier is less than an SCS of the scheduled carrier, there may be a plurality of shared PDSCHs.

Manner 2:

Two pieces of HARQ-ACK information are fed back for the PDSCHs on the two carriers. Optionally, the terminal device and the network device uniformly predefine the following rule.

When determining HARQ-ACK information, the terminal device and the network device use HARQ-ACK information corresponding to a PDSCH on the scheduling carrier or HARQ-ACK information corresponding to a PDSCH on the scheduled carrier as final feedback information. Specifically, for example, when the terminal device sends the HARQ-ACK information to the network device, the terminal device sends HARQ information of the PDSCH corresponding to carrier 1 and HARQ information of the PDSCH corresponding to carrier 2 to the network device. In this case, the network device validates one piece of HARQ-ACK information, and ignores the other piece of HARQ-ACK information. Specifically, one of the two pieces of HARQ-ACK information is valid, and the other is invalid. The network device and the terminal device may define the foregoing rule in advance, so that valid HARQ-ACK information can be learned of and applied without air interface interaction.

Manner 3:

Two pieces of HARQ-ACK information are fed back for the PDSCHs on the two carriers. Optionally, the terminal device and the network device uniformly predefine the following rule.

When generating HARQ-ACK information corresponding to the PDSCHs on the two carriers, the terminal device ensures that the HARQ-ACK information is the same. Specifically, for one PDSCH that is scheduled by using one piece of DCI and that is mapped to different carriers, the terminal device does not expect to feed back two pieces of different HARQ-ACK information.

Figure 10:
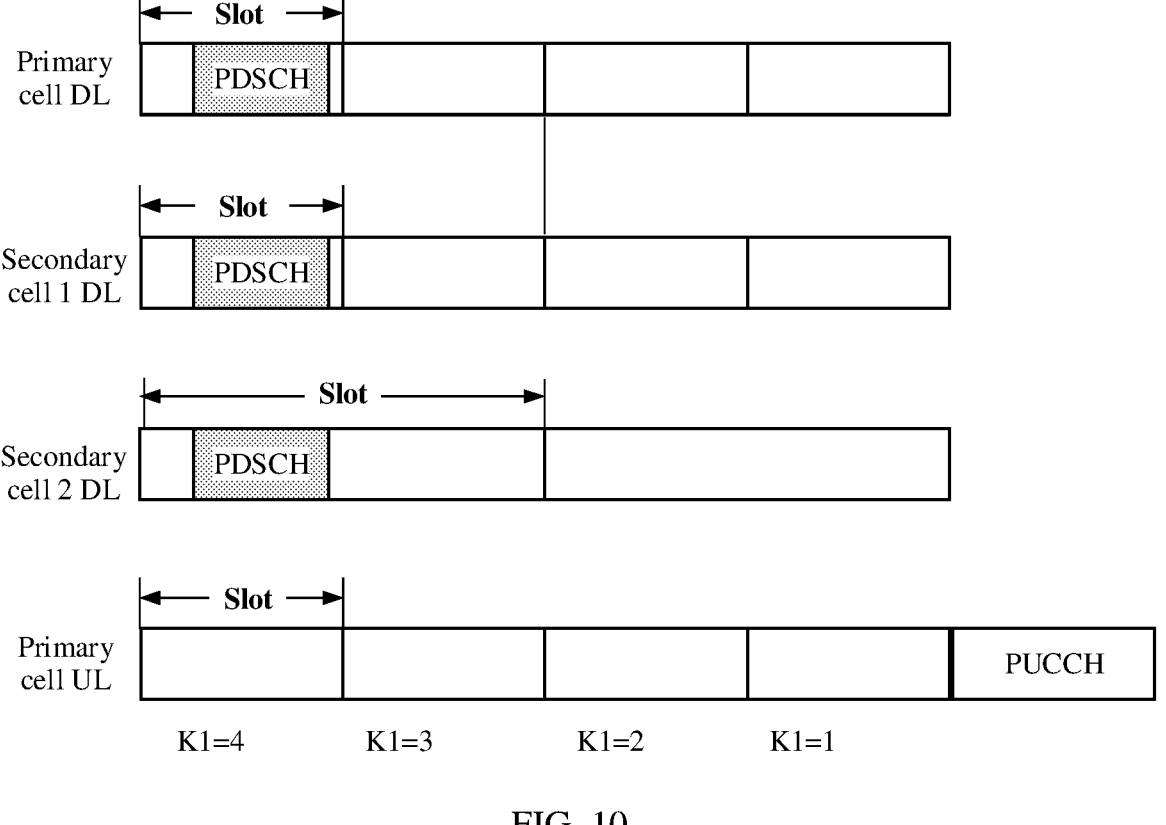
FIG. 10 is a schematic diagram of semi-persistent HARQ codebook configuration applicable to an embodiment of this application.

Specifically, as shown in FIG. 10, a primary cell and secondary cell 1 perform joint scheduling, and secondary cell 2 performs single-carrier scheduling. In this case, manners of determining HARQ-ACK information corresponding to PDSCHs in the primary cell and secondary cell 1 may include manners 1 to 3 in the foregoing method #2. For example, according to manner 1, the PDSCHs in the primary cell and secondary cell 1 correspond to one piece of HARQ-ACK information. According to manner 2, the PDSCH in the primary cell corresponds to one piece of HARQ-ACK information, the PDSCH in secondary cell 1 corresponds to another piece of HARQ-ACK information, where at least one piece of HARQ-ACK information is valid. According to manner 3, the PDSCH in the primary cell corresponds to one piece of HARQ-ACK information, the PDSCH in secondary cell 1 corresponds to another piece of HARQ-ACK information, where the foregoing two pieces of HARQ-ACK information are the same.

Case 2

For example, two cells are configured for one terminal device. The network device sends indication information to the terminal device in cell 1, to schedule the terminal device to receive, in cell 1 and cell 2, downlink data sent by the network device. The downlink data is carried in a same TB or a single TB. The following uses an example in which the downlink data is transmitted on carrier 1 of cell 1 and carrier 2 of cell 2 for description.

It may be understood that cell 1/carrier 1 may be a cell/carrier via which the terminal device receives DCI or via which the network device sends DCI, or may be referred to as a scheduling cell/carrier. Accordingly, a cell/carrier via which the terminal device receives a PDSCH or a cell/carrier via which the network sends a PDSCH may be referred to as a scheduled cell/carrier. Further, the following lists different scenarios.

The DCI and the PDSCH may be located in a same cell, or may be located in different cells.

The DCI and the PDSCH may be located on different carriers of different cells, or may be located on different carriers of a same cell.

A plurality of PDSCHs may be located in a same cell, or located in different cells.

A plurality of PDSCHs may be located on different carriers of different cells, or may be located on different carriers of a same cell.

Specifically, the semi-persistent HARQ codebook may be determined by using at least the following methods.

Method #1

For one PDSCH mapped to two carriers in joint scheduling, the terminal device and the network device predefine the following rule.

When a PDSCH candidate set on the scheduling carrier is calculated, it is considered that the PDSCH is a valid PDSCH candidate, and one piece of HARQ-ACK information is to be generated. When a PDSCH candidate set on the scheduled carrier is calculated, it is not considered that the PDSCH is a valid PDSCH candidate. Therefore, the PDSCH candidate set is not calculated. In this case, the terminal device may generate the semi-persistent HARQ codebook and feed back the HARQ codebook according to the foregoing descriptions.

Method #2

For one PDSCH mapped to two carriers in joint scheduling, when calculating a PDSCH candidate set, the terminal device considers that PDSCHs on the scheduling carrier and the scheduled carrier are both valid candidate PDSCHs. The following describes three manners to ensure that the terminal device and the network device have a consistent understanding on HARQ codebook feedback.

Manner 1:

Only one piece of HARQ-ACK information is fed back for the second PDSCH on the two carriers. Optionally, the terminal device and the network device uniformly predefine the following rule.

When determining a PDSCH candidate set, the terminal device and the network device calculate only a PDSCH candidate set on the scheduling carrier, namely, a carrier on which the DCI is sent, and do not calculate a PDSCH candidate set on the scheduled carrier. In this case, the two PDSCHs in the DCI share HARQ-ACK information corresponding to the PDSCHs on the scheduling carrier, and the terminal device feeds back the HARQ-ACK information at a PDSCH candidate location corresponding to the scheduling carrier.

Manner 2:

Two pieces of HARQ-ACK information are fed back for the PDSCHs on the two carriers. Optionally, the terminal device and the network device uniformly predefine the following rule.

When determining HARQ-ACK information, the terminal device and the network device use HARQ-ACK information corresponding to a PDSCH on the scheduling carrier or HARQ-ACK information corresponding to a PDSCH on the scheduled carrier as final feedback information. Specifically, for example, when the terminal device sends the HARQ-ACK information to the network device, the terminal device sends HARQ information of the PDSCH corresponding to carrier 1 and HARQ information of the PDSCH corresponding to carrier 2 to the network device. In this case, the network device validates one piece of HARQ-ACK information, and ignores the other piece of HARQ-ACK information.

Manner 3:

Two pieces of HARQ-ACK information are fed back for the PDSCHs on the two carriers. Optionally, the terminal device and the network device uniformly predefine the following rule.

When generating HARQ-ACK information corresponding to the PDSCHs on the two carriers, the terminal device ensures that the HARQ-ACK information is the same. Specifically, for a plurality of PDSCHs that are scheduled by using one piece of DCI and that are mapped to different carriers, the terminal device does not expect to feed back two pieces of different HARQ-ACK information.

Dynamic HARQ Codebook:

The dynamic HARQ codebook is a codebook generation mode in which a HARQ codebook dynamically changes based on actual data scheduling.

A manner of generating the dynamic codebook is implemented by using a counter DAI (C-DAI) and a total DAI (T-DAI) included in DCI. The C-DAI is included in DCI format 1_0 or DCI format 1_1, and indicates an accumulative quantity of {serving cell, PDCCH monitoring occasion}-pairs in which a PDSCH scheduled by using DCI format 1_0 or DCI format 1_1 or a downlink SPS release indicated by DCI format 1_0 is present up to a current serving cell and a current PDCCH monitoring occasion. Accumulation is performed first in a sequence of serving cell indexes and then in a sequence of PDCCH monitoring occasion indexes. The T-DAI is included in DCI format 1_1, and indicates a total quantity of {serving cell, PDCCH monitoring occasion}-pairs in which a PDSCH scheduled by using DCI format 1_0 or DCI format 1_1 or a downlink SPS release indicated by DCI format 1_0 is present up to a current PDCCH monitoring occasion. The total quantity may be updated on each PDCCH monitoring occasion.

Figure 11:
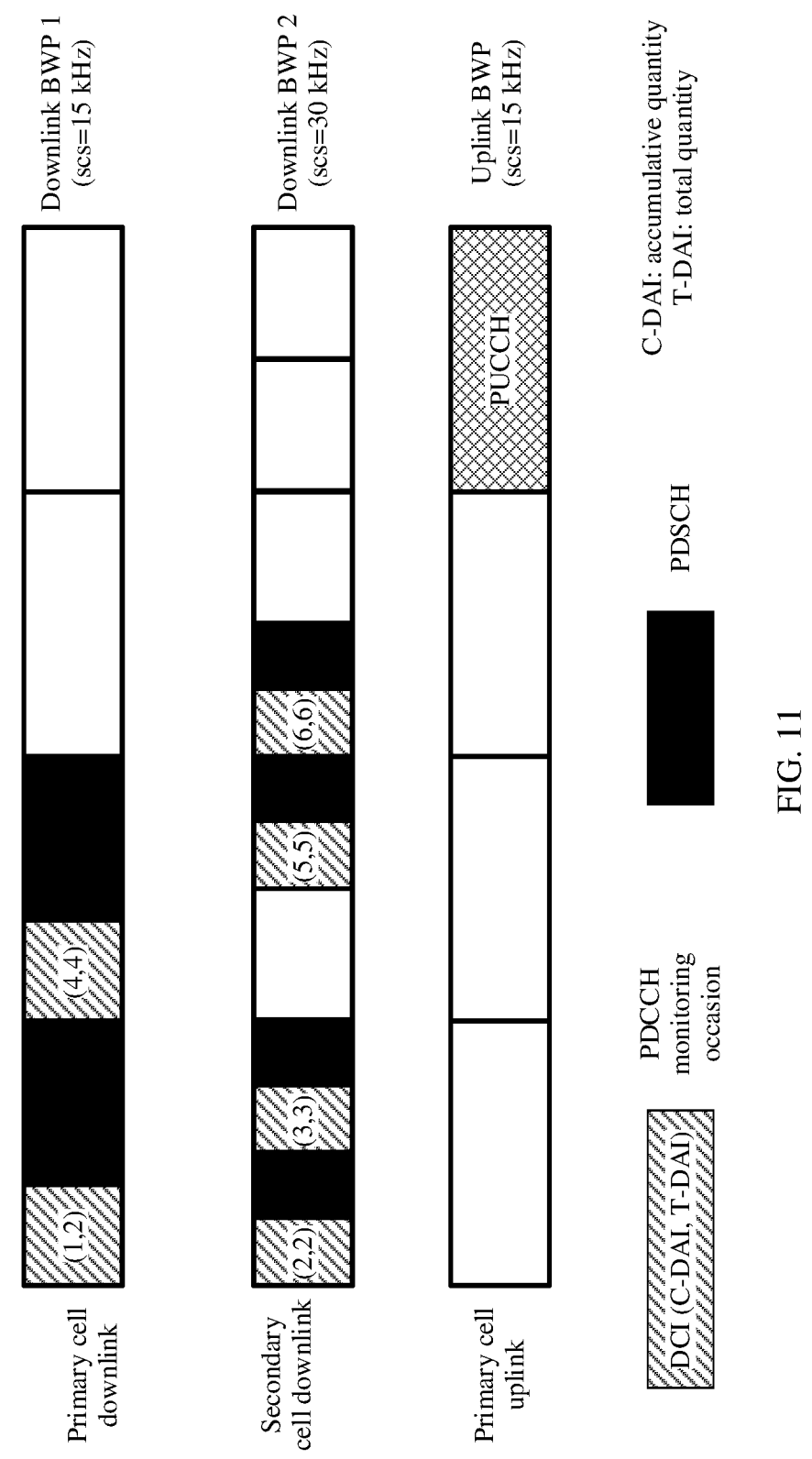
FIG. 11 is a schematic diagram of a manner of obtaining a dynamic HARQ codebook through calculation.

Specifically, descriptions are provided with reference to FIG. 11. FIG. 11 shows a manner of calculating a dynamic HARQ codebook. As shown in FIG. 11, the dynamic HARQ codebook is generated based on a counter DAI and a total DAI of {serving cell, PDCCH monitoring occasion}-pairs. Counting is performed by using a start time point of the PDCCH monitoring occasion as a reference, and is performed first in a sequence of serving cell sequence numbers and then in a sequence of PDCCH monitoring occasions.

Figure 12:
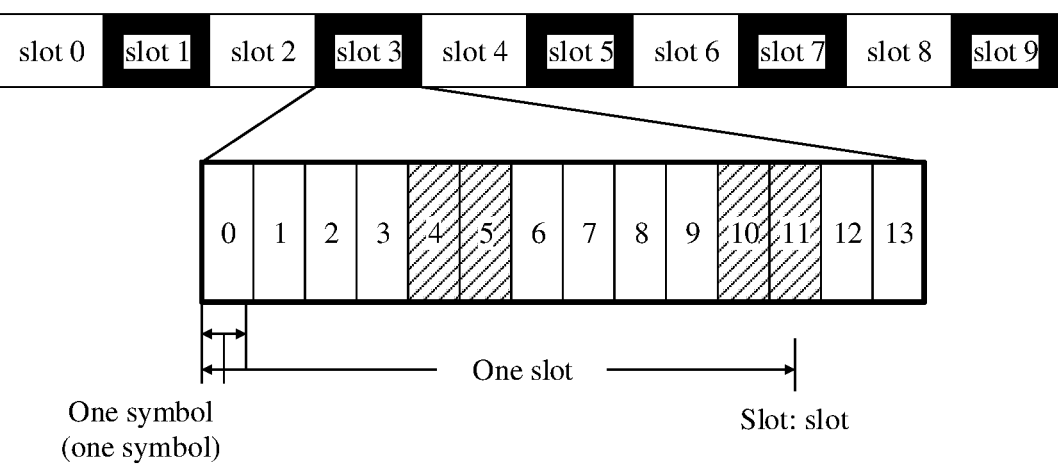
FIG. 12 is a schematic diagram of a PDCCH monitoring occasion applicable to an embodiment of this application.

The PDCCH monitoring occasion is a time unit for monitoring a PDCCH, and a related parameter is provided in a search space configuration. The PDCCH monitoring occasion is determined based on three parameters configured through RRC: a PDCCH monitoring periodicity, a PDCCH monitoring offset, and a PDCCH monitoring mode. As shown in FIG. 12, a PDCCH monitoring periodicity is two slots, an offset value is 1, and the PDCCH monitoring periodicity corresponds to slot positions in black parts in the figure. Further, the PDCCH monitoring mode indicates a position of a PDCCH monitoring occasion in a slot. In the PDCCH monitoring mode, a 14-bit bitmap indicates a position of a symbol that is to be monitored. In the figure, a 14-bit indication is a binary number (00001100001100), and each bit represents a position of a symbol, where 1 indicates that monitoring is required, and 0 indicates that monitoring is not required. In this way, symbols 4, 5, 10, and 11 in a slot corresponding to the black parts in the figure need to be monitored.

This embodiment of this application further provides a HARQ codebook generation method. For example, the method includes: determining a C-DAI and/or a T-DAI based on a first message.

Optionally, a terminal device obtains a PDCCH monitoring occasion by using a second message. Then, the terminal device receives, based on the PDCCH monitoring occasion, the first message sent by a network device, where the first message indicates DCI. Specifically, the terminal device performs blind detection on the PDCCH monitoring occasion, to obtain the DCI sent by the network device. The second message may be an RRC message. This is not limited in this specification.

In this embodiment, that the terminal device receives downlink data from the network device may include: The terminal device receives PDSCHs of a first cell and a second cell based on the DCI. The DCI is described in detail subsequently.

Optionally, that the terminal device generates HARQ information based on the first message includes:

The terminal device determines a HARQ codebook based on the DCI. It may be understood that the first cell may be a cell via which the terminal device receives the DCI or via which the network device sends the DCI, or may be referred to as a scheduling cell. Accordingly, a cell via which the terminal device receives a PDSCH or a cell via which the network sends a PDSCH may be referred to as a scheduled cell. Further, the following lists different scenarios.

The DCI and the PDSCH may be located in a same cell, or may be located in different cells.

The DCI and the PDSCH may be located on different carriers of different cells, or may be located on different carriers of a same cell.

A plurality of PDSCHs may be located in a same cell, or located in different cells.

A plurality of PDSCHs may be located on different carriers of different cells, or may be located on different carriers of a same cell.

Optionally, the DCI indicates a DAI of a first PDSCH of the first cell. The PDSCH of the second cell shares the DAI, and the DAI has a C-DAI and a T-DAI.

Alternatively, the T-DAI or the C-DAI may be sent by the network device to the terminal device by using DCI in different formats. For example, the C-DAI may be carried in DCI format 1-0 or a DCI format 1-1, and the T-DAI may also be carried in DCI format 1-0 or DCI format 1-1.

It may be understood that the C-DAI indicates an accumulative quantity corresponding to a current PDCCH monitoring occasion. For example, the accumulative quantity corresponding to the PDCCH monitoring occasion may be an accumulative quantity of received PDSCHs, SPS PDSCH releases, or DCI indicating an SCell dormancy indication and having no data scheduling. The DCI format may be format 1-0 or format 1-1. The T-DAI indicates a total quantity corresponding to the current PDCCH monitoring occasion. For example, the total quantity corresponding to the PDCCH monitoring occasion may be a total quantity of received PDSCHs, SPS PDSCH releases, or DCI indicating an SCell dormancy indication and having no data scheduling. The DCI format may be format 1-0 or format 1-1. In some embodiments, generating the HARQ codebook includes:

The terminal device determines, based on the C-DAI and the T-DAI, a HARQ codebook corresponding to the first PDSCH and a HARQ codebook corresponding to a second PDSCH.

Optionally, the DCI indicates a T-DAI and a first C-DAI of the first PDSCH of the first cell, a second C-DAI of the PDSCH of the second cell, and the PDSCH of the second cell shares the T-DAI of the first PDSCH.

In some embodiments, the HARQ codebook includes HARQ information corresponding to the first PDSCH and HARQ information corresponding to the second PDSCH.

Optionally, the network device sends the DCI to the terminal device, where the DCI includes information about the C-DAI, and the C-DAI is determined based on a cell ID and the PDCCH monitoring occasion. The terminal device generates the HARQ information based on the information about the C-DAI.

Optionally, the DCI may further include information about the T-DAI, and the T-DAI is determined based on a cell ID and the PDCCH monitoring occasion. The terminal device may generate the HARQ information based on the C-DAI and the T-DAI.

In this embodiment, a same manner or different manners may be used for DCI sizes and formats used by the network device to jointly schedule a plurality of carriers based on different scheduling. If a DCI size and format used for joint scheduling are different from a DCI size and format used for single-carrier scheduling, the terminal device may determine, based on the DCI format and/or a scrambled RNTI, whether the DCI is used for the joint scheduling or the single-carrier scheduling. If a DCI size/format used for joint scheduling is the same as a DCI size/format used for single-carrier scheduling, the terminal device first determines whether the DCI is used for the single-carrier scheduling or the joint scheduling, for example, by performing scrambling by using different RNTIs or adding a joint scheduling indication field. After determining a purpose of scheduling DCI, the terminal device may generate the dynamic HARQ codebook based on bit information in a DAI field in the DCI.

The following describes how to generate the dynamic HARQ codebook in two cases.

Case 1

For example, two cells are configured for one terminal device. The network device sends indication information to the terminal device in cell 1, to schedule the terminal device to receive, in cell 1 and cell 2, downlink data sent by the network device. The downlink data is carried in a same TB or a single TB. The following uses an example in which the downlink data is transmitted on carrier 1 of cell 1 and carrier 2 of cell 2 for description.

Specifically, the dynamic HARQ codebook may be determined by using at least the following methods.

The joint scheduling includes one PDSCH, which is mapped to carriers 1 and 2, and a sequence of the dynamic codebook is determined based on {serving cell, PDCCH monitor occasion}. In this embodiment, the network device may configure at least one of a CORESET or a PDCCH monitoring occasion on carrier 1 on which the indication information is sent. In other words, the network device may not configure a CORESET and a PDCCH monitoring occasion on carrier 2, or may not send, on carrier 2, DCI for scheduling the downlink data, DCI indicating an SPS release, or DCI indicating an SCell dormancy indication. In this case, for a manner of generating the dynamic HARQ codebook, refer to the foregoing descriptions. Details are not described below again.

Case 2

For a same example, two cells are configured for one terminal device. The network device sends indication information to the terminal device in cell 1, to schedule the terminal device to receive, in cell 1 and cell 2, downlink data sent by the network device. The downlink data is carried in different TBs. The following uses an example in which the downlink data is transmitted on carrier 1 of cell 1 and carrier 2 of cell 2 for description.

Specifically, the dynamic HARQ codebook may be determined by using at least any one of the following methods.

Method #1

Specifically, joint scheduling includes a plurality of PDSCHs, and the plurality of PDSCHs share a same DAI field. The plurality of PDSCHs have same information, and RV version numbers of the plurality of PDSCHs may be the same or different. That is, a same TB corresponds to different RV versions or a same RV version. In this case, only one piece of HARQ-ACK information is to be fed back for the plurality of PDSCHs, that is, one dynamic HARQ codebook is to be fed back. In this case, for a manner of generating the dynamic HARQ codebook, refer to the foregoing descriptions. Details are not described below again.

Method #2

In this solution, DCI may indicate a DAI of a first PDSCH of a first cell. A PDSCH of a second cell shares the DAI, and the DAI includes a C-DAI and a T-DAI.

Optionally, generating a HARQ codebook includes: The terminal device determines, based on the C-DAI and the T-DAI, a HARQ codebook corresponding to the first PDSCH and a HARQ codebook corresponding to a second PDSCH.

Specifically, joint scheduling includes a plurality of PDSCHs, and the plurality of PDSCHs share a same DAI field. The plurality of PDSCHs have different information, and joint feedback is required. Same as method #1, only one piece of HARQ-ACK information is to be fed back for the plurality of PDSCHs, and the HARQ-ACK information may be fed back by using one dynamic HARQ codebook. In this case, for a manner of generating the dynamic HARQ codebook, refer to the foregoing descriptions. Details are not described below again.

Method #3

In this solution, DCI may indicate a T-DAI and a C-DAI of a PDSCH. PDSCHs of a first cell and a second cell share the C-DAI and the T-DAI.

Optionally, generating a HARQ codebook includes:

The terminal device determines the HARQ codebook based on the C-DAI and the T-DAI.

The HARQ codebook may correspond to HARQ-ACK information of the PDSCHs of the first cell and the second cell.

Specifically, joint scheduling includes a plurality of PDSCHs, and the plurality of PDSCHs share a same C-DAI field and a same T-DAI field. The plurality of PDSCHs need separate feedback of HARQ-ACK information corresponding to the PDSCHs. Therefore, a plurality of pieces of HARQ-ACK information need to be fed back for the plurality of PDSCHs. To ensure that the network device and the terminal device have a consistent understanding of the dynamic HARQ codebook, the following rules may be predefined: If a quantity of scheduling PDSCHs is 2, the terminal device generates $n^{th}$ and $(n+1)^{th}$ pieces of HARQ-ACK information for a C-DAI value n in the DCI, where n is a positive integer.

Optionally, the $n^{th}$ and $(n+1)^{th}$ pieces of HARQ-ACK information respectively correspond to the following:

the PDSCH of the first cell and the PDSCH of the second cell;

the PDSCH of the second cell and the PDSCH of the first cell; or determining a correspondence between the $n^{th}$ and $(n+1)^{th}$ pieces of HARQ-ACK information based on an ascending order or a descending order of cell indexes of the first cell and the second cell.

Figure 13:
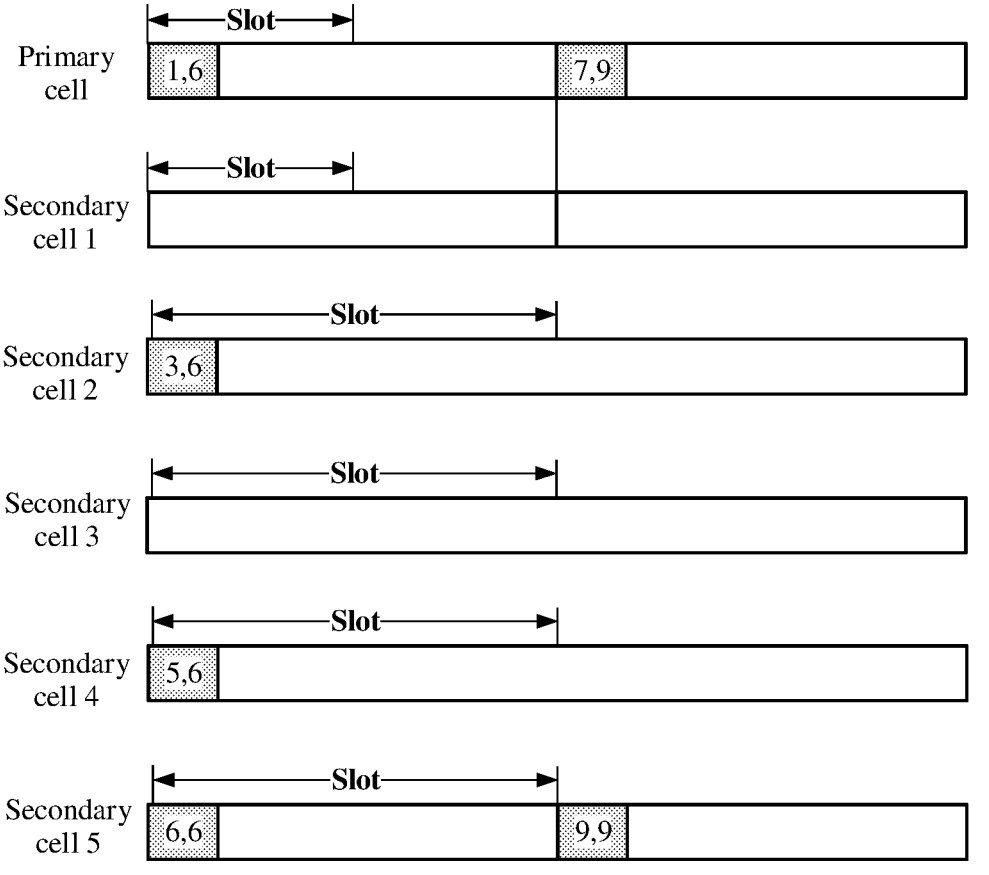
FIG. 13 is a schematic diagram of dynamic codebook configuration applicable to an embodiment of this application.

Specifically, as shown in FIG. 13, a primary cell and secondary cell 1 perform joint scheduling, secondary cell 2 and secondary cell 3 perform joint scheduling, and secondary cell 4 and secondary cell 5 perform single-carrier scheduling. PDSCHs of the primary cell and secondary cell 1 share a same DAI, PDSCHs of secondary cell 2 and secondary cell 3 share a same DAI, and PDSCHs of secondary cell 4 and secondary cell 5 have different DAIs. A person skilled in the art may understand that, according to the HARQ-ACK information determining manner in the foregoing method #2 or method #3, if a monitoring periodicity set has a plurality of values or downlink data scheduled in a plurality of TDD periodicities is fed back by using one piece of uplink control information (UCI), for the first periodicity or the first slot in the set, the T-DAI is a sum of scheduling carriers. As shown in FIG. 13, secondary cell 1 shares the DAI of the primary cell, and secondary cell 3 shares the DAI of secondary cell 2. Therefore, a T-DAI in the first periodicity is 6, and a T-DAI in the second periodicity is 9.

Method #4

In this solution, DCI may indicate a first DAI of a first PDSCH of a first cell and a second DAI of a PDSCH of a second cell. The first DAI or the second DAI includes a T-DAI and a C-DAI respectively.

Optionally, generating a HARQ codebook includes:

The terminal device determines the HARQ codebook based on the first DAI and the second DAI.

The HARQ codebook includes first HARQ-ACK information corresponding to the first PDSCH and second HARQ-ACK information corresponding to the second PDSCH.

Joint scheduling includes a plurality of PDSCHs, and the plurality of PDSCHs respectively correspond to DAI fields. The network device configures two DAI fields in the DCI, where the first DAI identifies the C-DAI and the T-DAI that are of the first PDSCH in the first cell, and the second DAI identifies the C-DAI and the T-DAI that are of the second PDSCH in the second cell. Optionally, the second DAI identifies only the C-DAI of the second PDSCH, and the first PDSCH and the second PDSCH share a same T-DAI. In this case, air interface resources can be saved.

For example, a DCI format that is for joint scheduling and that is different from that for single-carrier scheduling may be used. Specifically, the DCI format includes a 4-bit field for indicating the C-DAI and the T-DAI of the first PDSCH. The T-DAI of the first PDSCH also indicates the T-DAI of the second PDSCH. Further, the DCI format may further include a two-bit field for indicating the C-DAI of the second PDSCH.

Figure 14:
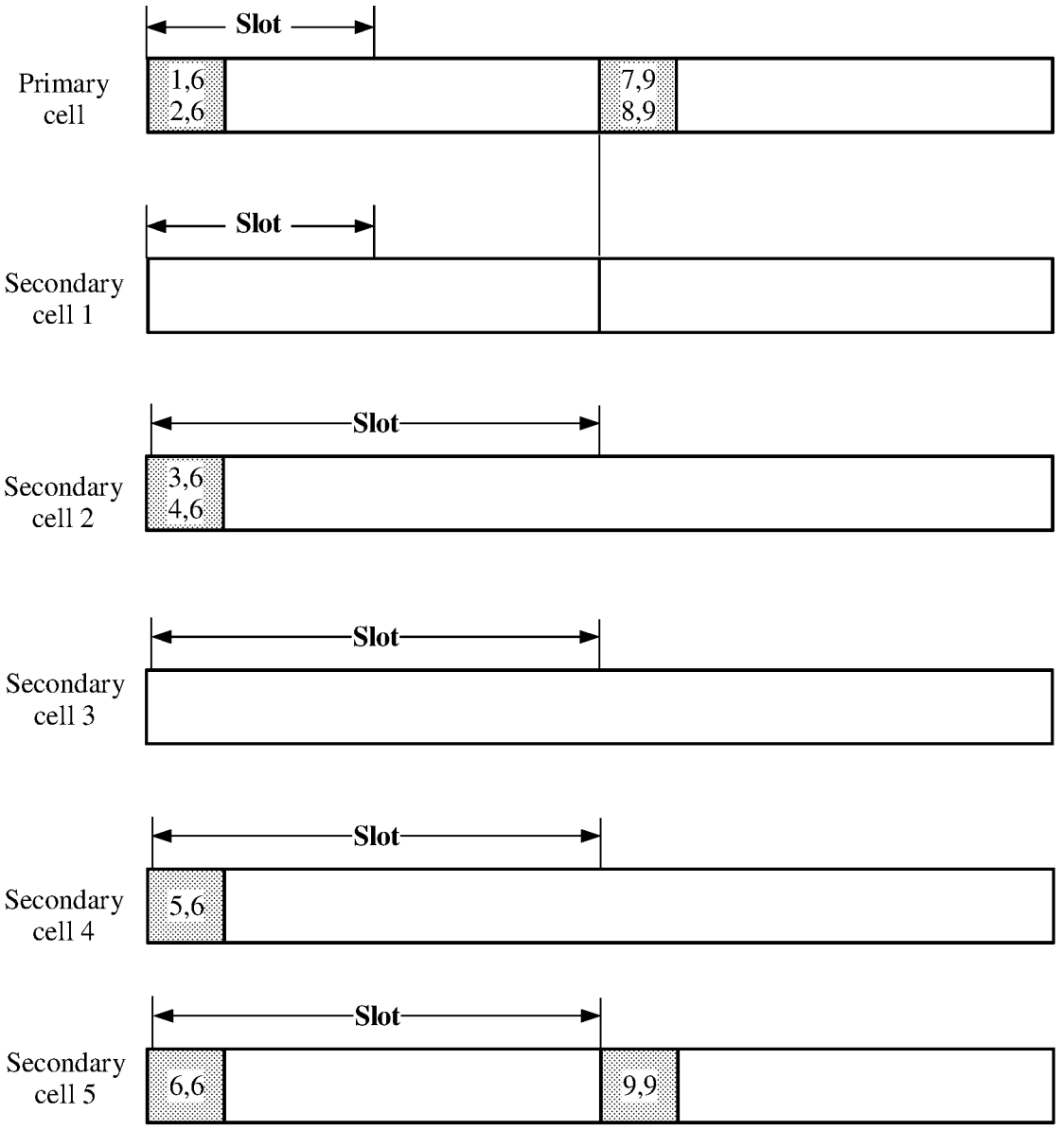
FIG. 14 is another schematic diagram of dynamic codebook configuration applicable to an embodiment of this application.

Specifically, as shown in FIG. 14, a primary cell and secondary cell 1 perform joint scheduling, secondary cell 2 and secondary cell 3 perform joint scheduling, and secondary cell 4 and secondary cell 5 perform single-carrier scheduling. PDSCHs of the primary cell and secondary cell 1 have separate DAIs, PDSCHs of secondary cell 2 and secondary cell 3 have separate DAIs, and PDSCHs of secondary cell 4 and secondary cell 5 have separate DAIs. A person skilled in the art may understand that, according to the HARQ-ACK information determining manner in the foregoing method #4, if a monitoring periodicity set has a plurality of values or downlink data scheduled in a plurality of TDD periodicities is fed back by using one piece of uplink control information (UCI), for the first periodicity or the first slot in the set, the T-DAI is a sum of scheduling carriers. As shown in FIG. 14, secondary cell 1 does not share a DAI of the primary cell, and secondary cell 3 does not share a DAI of secondary cell 2. Therefore, in the first periodicity, a T-DAI is 6, a C-DAI of the primary cell is 1, a C-DAI of secondary cell 1 is 2, a C-DAI of secondary cell 2 is 3, and a C-DAI of secondary cell 3 is 4. In the second periodicity, a T-DAI is 9, a C-DAI of the primary cell is 7, and a C-DAI of secondary cell 1 is 8.

Figure 15:
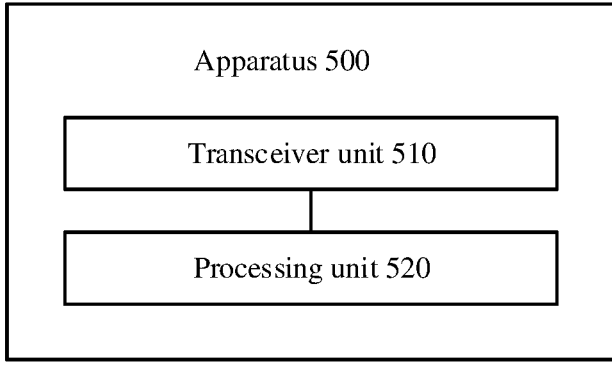
FIG. 15 is a schematic block diagram of an apparatus for generating a HARQ codebook according to an embodiment of this application.

FIG. 15 is a schematic block diagram of an apparatus for generating a HARQ codebook according to an embodiment of this application. As shown in FIG. 15, the apparatus 500 may include a transceiver unit 510 and a processing unit 520.

In a possible design, the apparatus 500 may be a terminal device or a chip disposed in the terminal device.

In a possible implementation, the transceiver unit 510 is configured to receive a first message from a network device, where the first message is for scheduling downlink data in a plurality of cells. The processing unit 520 is configured to generate a HARQ codebook based on the first message.

Optionally, the transceiver unit 510 is further configured to receive the downlink data from the network device, where the downlink data is located in a same transport block.

Optionally, the downlink data in the plurality of cells includes: the plurality of cells have a same transport block for carrying the downlink data; or the plurality of cells have different transport blocks for carrying the downlink data.

Optionally, the plurality of cells include at least a second cell and a first cell that is for receiving the first message. Alternatively, the plurality of cells include at least a first cell and a second cell, where the first cell has a first transport block for a first physical downlink shared channel PDSCH, and the second cell has a second transport block for a second PDSCH.

The following further describes a dynamic HARQ codebook solution.

Optionally, the first message indicates downlink control information DCI. The transceiver unit 510 is configured to receive the PDSCHs of the first cell and the second cell based on the DCI. The processing unit 520 is configured to determine the HARQ codebook based on the DCI.

Optionally, the transceiver unit 510 is further configured to: obtain a PDCCH monitoring occasion by using a second message; and receiving the DCI on the PDCCH monitoring occasion, where there are one or more pieces of DCI.

Optionally, the DCI indicates a DAI of the first PDSCH of the first cell, the PDSCH of the second cell shares the DAI, and the DAI includes a counter DAI C-DAI and a total DAI T-DAI. The HARQ codebook includes HARQ information corresponding to the first PDSCH and HARQ information corresponding to the second PDSCH.

Optionally, the DCI indicates a T-DAI and a first C-DAI of the first PDSCH of the first cell, a second C-DAI of the PDSCH of the second cell, and the PDSCH of the second cell shares the T-DAI. The HARQ codebook includes HARQ information corresponding to the first PDSCH and HARQ information corresponding to the second PDSCH.

The following further describes a semi-persistent HARQ codebook solution.

Optionally, the first message is an RRC message. The processing unit 520 is configured to: determine the first PDSCH of the first cell based on the RRC message; determine a PDSCH receiving occasion set based on the first PDSCH of the first cell; and determine the HARQ codebook based on the PDSCH receiving occasion set. The HARQ codebook includes HARQ information corresponding to the first PDSCH and HARQ information corresponding to the second PDSCH.

Optionally, the first message is an RRC message. The processing unit 520 is configured to: determine the first PDSCH of the first cell and the PDSCH of the second cell based on the RRC message; determine a PDSCH receiving occasion set based on the first PDSCH of the first cell and the PDSCH of the second cell; and determine the HARQ codebook based on the PDSCH receiving occasion set, where the HARQ codebook includes first HARQ information corresponding to the first PDSCH and second HARQ information corresponding to the second PDSCH. One of the first HARQ information and the second HARQ information is valid.

Optionally, the first message is an RRC message. The processing unit 520 is configured to: determine the first PDSCH of the first cell and the PDSCH of the second cell based on the RRC message; determine a PDSCH receiving occasion set based on the first PDSCH of the first cell and the PDSCH of the second cell; and determine the HARQ codebook based on the PDSCH receiving occasion set, where the HARQ codebook includes first HARQ information corresponding to the first PDSCH and second HARQ information corresponding to the second PDSCH. The first HARQ information is the same as the second HARQ information.

Specifically, the apparatus 500 may correspond to the terminal device in the HARQ codebook generation method according to embodiments of this application. The apparatus 500 may include modules configured to perform the method performed by the terminal device in the method 200 in FIG. 6. In addition, the modules in the apparatus 500 and the foregoing other operations and/or functions are separately used to implement corresponding procedures in the method 200 in FIG. 6. Specifically, the transceiver unit 510 is configured to perform step 210 in the method 200, and the processing unit 520 is configured to perform step 220 in the method 200. A specific process of performing the foregoing corresponding steps by the units has been described in detail in the method 200. For brevity, details are not described herein again.

In another possible design, the apparatus 500 may be a network device or a chip disposed in the network device.

In a possible implementation, the transceiver unit 510 is configured to send a first message to a terminal device, where the first message is for scheduling downlink data in a plurality of cells. The transceiver unit 510 is further configured to receive a HARQ codebook sent by the terminal device.

Optionally, the transceiver unit 510 is further configured to send the downlink data to the terminal device, where the downlink data is located in a same transport block.

Optionally, the downlink data in the plurality of cells includes: the plurality of cells have a same transport block for carrying the downlink data; or the plurality of cells have different transport blocks for carrying the downlink data.

Optionally, the plurality of cells include at least a second cell and a first cell that is for sending the first message. Alternatively, the plurality of cells include at least a first cell and a second cell, where the first cell has a first transport block for a first physical downlink shared channel PDSCH, and the second cell has a second transport block for a second PDSCH.

The following further describes a dynamic HARQ solution.

Optionally, the first message indicates downlink control information DCI. The transceiver unit 510 is configured to send the PDSCHs of the first cell and the second cell to the terminal device based on the DCI.

Optionally, the transceiver unit 510 is further configured to: indicate a PDCCH monitoring occasion to the terminal device by using a second message; and send the DCI to the terminal device on the PDCCH monitoring occasion, where there are one or more pieces of DCI.

Optionally, the DCI indicates a DAI of the first PDSCH of the first cell, the PDSCH of the second cell shares the DAI, and the DAI includes a counter DAI C-DAI and a total DAI T-DAI. The HARQ codebook includes: HARQ information corresponding to the first PDSCH and HARQ information corresponding to the second PDSCH.

Optionally, the DCI indicates a T-DAI and a first C-DAI of the first PDSCH of the first cell, a second C-DAI of the PDSCH of the second cell, and the PDSCH of the second cell shares the T-DAI. The HARQ codebook includes HARQ information corresponding to the first PDSCH and HARQ information corresponding to the second PDSCH.

The following further describes a semi-persistent HARQ solution.

Optionally, the first message is an RRC message, and is used by the terminal device to determine the first PDSCH of the first cell. The HARQ codebook includes HARQ information corresponding to the first PDSCH and HARQ information corresponding to the second PDSCH.

Optionally, the first message is an RRC message, and is used by the terminal device to determine the first PDSCH of the first cell and the PDSCH of the second cell. The HARQ codebook includes first HARQ information corresponding to the first PDSCH and second HARQ information corresponding to the second PDSCH, where one of the first HARQ information and the second HARQ information is valid.

Optionally, the first message is an RRC message, and is used by the terminal device to determine the first PDSCH of the first cell and the PDSCH of the second cell. The HARQ codebook includes first HARQ information corresponding to the first PDSCH and second HARQ information corresponding to the second PDSCH, where the first HARQ information is the same as the second HARQ information.

Specifically, the apparatus 500 may correspond to the network device in the HARQ codebook generation method according to embodiments of this application. The apparatus 500 may include modules configured to perform the method performed by the network device in the method 200 in FIG. 6. In addition, the modules in the apparatus 500 and the foregoing other operations and/or functions are separately used to implement corresponding procedures in the method 200 in FIG. 6. Specifically, the transceiver unit 510 is configured to perform step 210 in the method 200. A specific process of performing the foregoing corresponding steps by the units has been described in detail in the method 200. For brevity, details are not described herein again.

Figure 16:
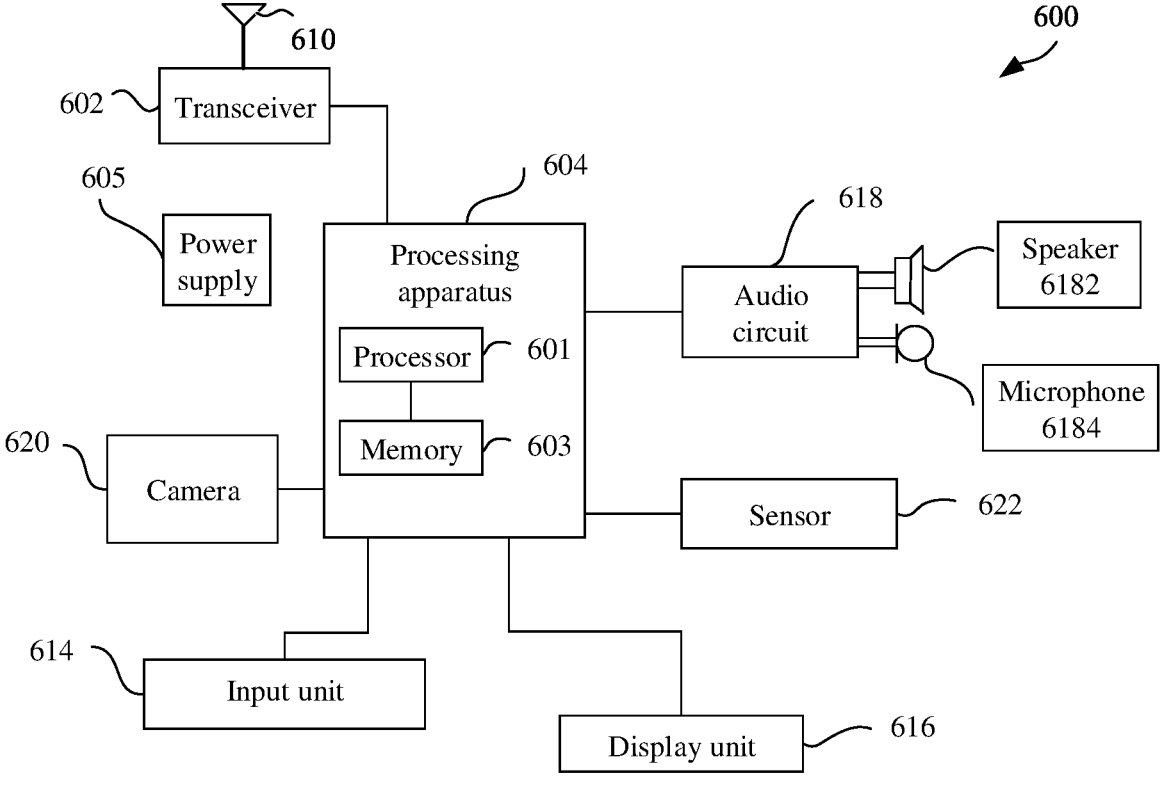
FIG. 16 is a schematic diagram of a structure of a terminal device according to an embodiment of this application.

FIG. 16 is a schematic diagram of a structure of a terminal device 600 according to an embodiment of this application. As shown in FIG. 16, the terminal device 600 includes a processor 601 and a transceiver 602. Optionally, the terminal device 600 further includes a memory 603. The processor 601, the transceiver 602, and the memory 603 communicate with each other through an internal connection path, to transfer a control signal and/or a data signal. The memory 603 is configured to store a computer program. The processor 601 is configured to invoke the computer program from the memory 603 and run the computer program, to control the transceiver 602 to receive and send a signal.

Optionally, the transceiver 602 may alternatively be a communication interface, configured to receive or send information, a signal, data, and the like that are for communication. For example, the communication interface may be an element that has receiving and sending functions, for example, a transmitter or a receiver. Alternatively, the communication interface may communicate with another device via the foregoing element that has receiving and sending functions. The foregoing element that has receiving and sending functions may be implemented by using an antenna and/or a radio frequency apparatus.

The processor 601 and the memory 603 may be integrated into one processing apparatus 604. The processor 601 is configured to execute program code stored in the memory 603 to implement the foregoing functions. During specific implementation, the memory 603 may alternatively be integrated into the processor 601, or may be independent of the processor 601. The terminal device 600 may further include an antenna 610, configured to send, by using a radio signal, uplink data or uplink control signaling output by the transceiver 602.

Specifically, the terminal device 600 may correspond to the terminal device in the method 200 according to embodiments of this application. The terminal device 600 may include modules configured to perform the method performed by the terminal device in the method 200 in FIG. 6. In addition, the modules in the terminal device 600 and the foregoing other operations and/or functions are separately used to implement corresponding procedures of the method 200 in FIG. 6. Specifically, the memory 603 is configured to store the program code, so that when executing the program code, the processor 601 performs step 220 in the method 200, and controls the transceiver 602 to perform step 210 in the method 200. A specific process of performing the foregoing corresponding steps by the modules has been described in detail in the method 200. For brevity, details are not described herein again.

The processor 601 may be configured to perform an action internally implemented by the terminal in the foregoing method embodiments, and the transceiver 602 may be configured to perform a transmitting action or a sending action by the terminal to the network device in the foregoing method embodiments. For details, refer to the descriptions in the foregoing method embodiments. Details are not described herein again.

The processor 601 and the memory 603 may be integrated into one processing apparatus. The processor 601 is configured to execute the program code stored in the memory 603 to implement the foregoing functions. During specific implementation, the memory 603 may alternatively be integrated into the processor 601.

The terminal device 600 may further include a power supply 605, configured to supply power to various components or circuits in the terminal.

In addition, to enhance functions of the terminal device, the terminal device 600 may further include one or more of an input unit 614, a display unit 616, an audio circuit 618, a camera 620, a sensor 622, and the like, and the audio circuit may further include a speaker 6182, a microphone 6184, and the like.

Figure 17:
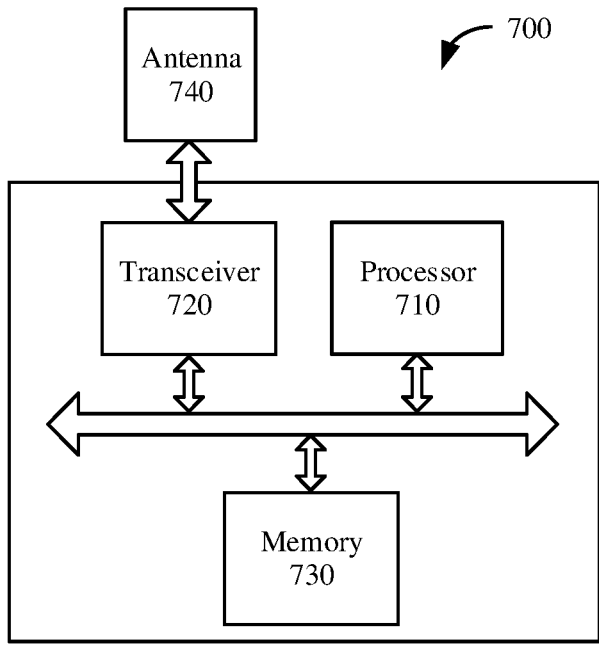
FIG. 17 is a schematic diagram of a structure of a network device according to an embodiment of this application.

FIG. 17 is a schematic diagram of a structure of a network device 700 according to an embodiment of this application. As shown in FIG. 17, the network device 700 includes a processor 710 and a transceiver 720. Optionally, the network device 700 further includes a memory 730. The processor 710, the transceiver 720, and the memory 730 communicate with each other through an internal connection path, to transfer a control signal and/or a data signal. The memory 730 is configured to store a computer program. The processor 710 is configured to invoke the computer program from the memory 730 and run the computer program, to control the transceiver 720 to receive and send a signal.

Optionally, the transceiver 720 may alternatively be a communication interface, configured to receive or send information, a signal, data, and the like that are for communication. For example, the communication interface may be an element that has receiving and sending functions, for example, a transmitter or a receiver. Alternatively, the communication interface may communicate with another device via the foregoing element that has receiving and sending functions. The foregoing element that has receiving and sending functions may be implemented by using an antenna and/or a radio frequency apparatus.

The processor 710 and the memory 730 may be integrated into one processing apparatus. The processor 710 is configured to execute program code stored in the memory 730 to implement the foregoing functions. During specific implementation, the memory 730 may alternatively be integrated into the processor 710, or may be independent of the processor 710.

The network device may further include an antenna 740, configured to send, by using a radio signal, downlink data or downlink control signaling output by the transceiver 720.

Specifically, the network device 700 may correspond to the network device in the method 200 for generating HARQ information according to embodiments of this application. The network device 700 may include modules configured to perform the method performed by the network device in the method 200 in FIG. 6. In addition, the modules in the network device 700 and the foregoing other operations and/or functions are separately used to implement corresponding procedures in the method 200 in FIG. 6. Specifically, the memory 730 is configured to store the program code, so that when executing the program code, the processor 710 controls the transceiver 720 to perform step 210 in the method 200 via the antenna 740. A specific process of performing the foregoing corresponding steps by the modules has been described in detail in the method 200. For brevity, details are not described herein again.

It should be understood that, the processor in embodiments of this application may be a central processing unit (CPU), or may be another general-purpose processor, a digital signal processor (DSP), an application-specific integrated circuit (ASIC), a field programmable gate array (FPGA), another programmable logic device, discrete gate or transistor logic device, discrete hardware component, or the like. The general-purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. By way of example but not limitation, random access memories (RAMs) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

According to the method provided in embodiments of this application, this application further provides a computer program product. The computer program product includes computer program code. When the computer program code is run on a computer, the computer performs the methods in the foregoing embodiments.

According to the method provided in embodiments of this application, this application further provides a computer-readable medium. The computer-readable medium stores program code. When the program code is run on a computer, the computer performs the methods in the foregoing embodiments.

According to the method provided in embodiments of this application, this application further provides a system. The system includes the foregoing network device and one or more terminal devices. All or a part of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed.

In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. All or a part of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for indicating a computer device (which may be a personal computer, a server, or a network device) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A hybrid automatic repeat request (HARQ) codebook generation apparatus, comprising:
   at least one processor; and
   a memory having instructions stored thereon that, when executed by the at least one processor, cause the HARQ codebook generation apparatus to:
   receive downlink control information (DCI) from a network device, wherein the DCI is used to schedule a first physical downlink shared channel (PDSCH) of a first cell and a second PDSCH of a second cell; and
   generate a HARQ codebook based on the DCI,
   wherein
   the HARQ codebook comprises HARQ information corresponding to the first PDSCH and HARQ information corresponding to the second PDSCH, and the HARQ codebook is organized based on cell indexes of the first cell and the second cell, and
   the DCI indicates a total downlink assignment index (T-DAI) and a first counter downlink assignment index (C-DAI) of the first PDSCH of the first cell, a second C-DAI of the second PDSCH of the second cell, and T-DAI applies to the first PDSCH of the first cell and the second PDSCH of the second cell.

2. The HARQ codebook generation apparatus according to claim 1, wherein the HARQ codebook generation apparatus is further caused to:

receive the first PDSCH of the first cell and the second PDSCH of the second cell based on the DCI.

3. The HARQ codebook generation apparatus according to claim 1, wherein the HARQ codebook generation apparatus is further caused to:

obtain a physical downlink control channel (PDCCH) monitoring occasion by using a radio resource control (RRC) message; and receive the DCI on the PDCCH monitoring occasion.

4. The HARQ codebook generation apparatus according to claim 1, wherein the first PDSCH is used for transmitting a first transport block, and the second PDSCH is used for transmitting a second transport block.

5. A communication apparatus, comprising:

at least one processor; and a memory having instructions stored thereon that, when executed by the at least one processor, cause the communication apparatus to:

send downlink control information (DCI) to a terminal device, wherein the DCI is used to schedule a first physical downlink shared channel (PDSCH) of a first cell and a second PDSCH of a second cell; and receive a hybrid automatic repeat request (HARQ) codebook from the terminal device, wherein the HARQ codebook comprises HARQ information corresponding to the first PDSCH and HARQ information corresponding to the second PDSCH, and the HARQ codebook is organized based on cell indexes of the first cell and the second cell, and the DCI indicates a total downlink assignment index (T-DAI) and a first counter downlink assignment index (C-DAI) of the first PDSCH of the first cell, a second C-DAI of the second PDSCH of the second cell, and T-DAI applies to the first PDSCH of the first cell and the second PDSCH of the second cell.

6. The communication apparatus according to claim 5, wherein the communication apparatus is further caused to:

send the first PDSCH of the first cell and the second PDSCH of the second cell to the terminal device based on the DCI.

7. The communication apparatus according to claim 5, wherein the communication apparatus is further caused to:

indicate a physical downlink control channel (PDCCH) monitoring occasion to the terminal device by using a radio resource control (RRC) message; and send the DCI to the terminal device on the PDCCH monitoring occasion.

8. The communication apparatus according to claim 5, wherein the first PDSCH is used for transmitting a first transport block, and the second PDSCH is used for transmitting a second transport block.

9. A hybrid automatic repeat request (HARQ) codebook generation method, comprising:

receiving downlink control information (DCI) from a network device, wherein the DCI is used to schedule a first physical downlink shared channel (PDSCH) of a first cell and a second PDSCH of a second cell; and generating a HARQ codebook based on the DCI, wherein the HARQ codebook comprises HARQ information corresponding to the first PDSCH and HARQ information corresponding to the second PDSCH, and the HARQ codebook is organized based on cell indexes of the first cell and the second cell, and the DCI indicates a total downlink assignment index (T-DAI) and a first counter downlink assignment index (C-DAI) of the first PDSCH of the first cell, a second C-DAI of the second PDSCH of the second cell, and T-DAI applies to the first PDSCH of the first cell and the second PDSCH of the second cell.

10. The HARQ codebook generation method according to claim 9, wherein the first PDSCH is used for transmitting a first transport block, and the second PDSCH is used for transmitting a second transport block.

11. The HARQ codebook generation method according to claim 9, further comprising:

receiving the first PDSCH of the first cell and the second PDSCH of the second cell based on the DCI.

12. The HARQ codebook generation method according to claim 9, further comprising:

obtaining a physical downlink control channel (PDCCH) monitoring occasion by using a radio resource control (RRC) message; and receiving the DCI on the PDCCH monitoring occasion.

* * * * *